United States Patent
Matsuo et al.

(10) Patent No.: US 9,695,766 B2
(45) Date of Patent: Jul. 4, 2017

(54) CONTROL APPARATUS FOR VEHICLE

(71) Applicant: TOYOTA JIDOSHA KABUSHIKI KAISHA, Toyota-shi, Aichi-ken (JP)

(72) Inventors: Kenji Matsuo, Toyota (JP); Akira Hino, Toyota (JP); Hiroki Kondo, Miyoshi (JP); Mitsuhiro Fukao, Toyota (JP); Daisuke Inoue, Toyota (JP); Akihide Ito, Nagoya (JP); Atsushi Ayabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/307,332

(22) PCT Filed: May 15, 2015

(86) PCT No.: PCT/IB2015/000916
§ 371 (c)(1),
(2) Date: Oct. 27, 2016

(87) PCT Pub. No.: WO2015/173637
PCT Pub. Date: Nov. 19, 2015

(65) Prior Publication Data
US 2017/0051691 A1 Feb. 23, 2017

(30) Foreign Application Priority Data
May 16, 2014 (JP) ................. 2014-102877

(51) Int. Cl.
*B60W 10/02* (2006.01)
*B60W 10/06* (2006.01)
(Continued)

(52) U.S. Cl.
CPC ......... *F02D 41/022* (2013.01); *F02D 41/062* (2013.01); *F02D 41/221* (2013.01);
(Continued)

(58) Field of Classification Search
None
See application file for complete search history.

(56) References Cited

U.S. PATENT DOCUMENTS

| | | | |
|---|---|---|---|
| 2002/0065168 A1* | 5/2002 | Kima | B60K 6/365 477/107 |
| 2002/0073802 A1* | 6/2002 | Sakamoto | B60K 6/36 74/665 A |

(Continued)

FOREIGN PATENT DOCUMENTS

| | | |
|---|---|---|
| JP | 2004-270891 A | 9/2004 |
| JP | 2011-122671 A | 6/2011 |
| JP | 2013-036567 A | 2/2013 |

*Primary Examiner* — Edwin A Young
(74) *Attorney, Agent, or Firm* — Oliff PLC

(57) ABSTRACT

A control apparatus for a vehicle includes an engine, a dog clutch and a friction clutch. The dog clutch is configured to transmit power or interrupt transmission of power in a power transmission path that transmits power of the engine to a drive wheel. The dog clutch includes a synchromesh mechanism. The friction clutch is configured to transmit power or interrupt transmission of power in the power transmission path between the engine and the dog clutch. The control apparatus includes: an electronic control unit. The electronic control unit is configured to, when the synchromesh mechanism is operated in order to engage the dog clutch in a state where the vehicle is stopped and the friction clutch is released, increase a rotation speed of the engine as compared to when the synchromesh mechanism is not operated.

6 Claims, 15 Drawing Sheets

(51) Int. Cl.
    *F02D 41/02*     (2006.01)
    *F16H 63/50*     (2006.01)
    *F02D 41/06*     (2006.01)
    *F02D 41/22*     (2006.01)
    *F16H 61/04*     (2006.01)
    *F16H 37/08*     (2006.01)

(52) U.S. Cl.
    CPC ............ F16H 61/04 (2013.01); F16H 63/502 (2013.01); *F16H 2037/0873* (2013.01); *F16H 2061/047* (2013.01)

(56) References Cited

U.S. PATENT DOCUMENTS

| | | |
|---|---|---|
| 2002/0137596 A1 | 9/2002 | Markyvech |
| 2012/0202648 A1* | 8/2012 | Kikura .................. B60W 10/02 477/87 |

* cited by examiner

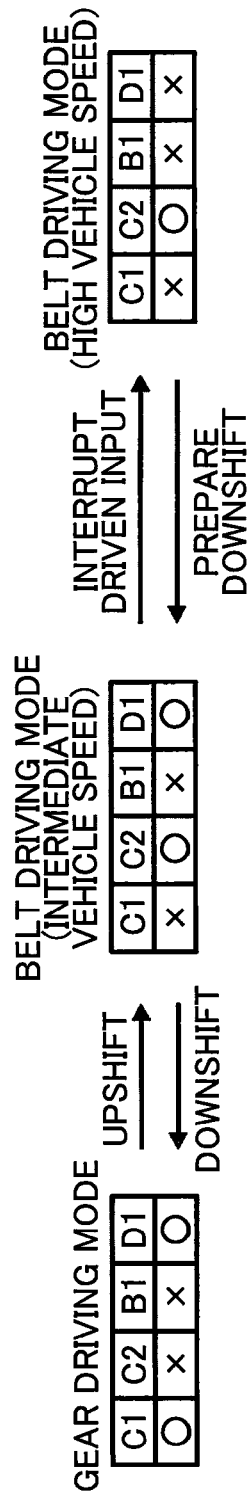

CONTROL APPARATUS FOR VEHICLE

BACKGROUND OF THE INVENTION

1. Field of the Invention

The invention relates to a control apparatus for a vehicle including a dog clutch that is equipped with a synchromesh mechanism and that transmits power or interrupts transmission of power in a power transmission path that transmits power of an engine to a drive wheel.

2. Description of Related Art

There is well known a vehicle including a dog clutch that is equipped with a synchromesh mechanism and that transmits power or interrupts transmission of power in a power transmission path that transmits power of an engine to a drive wheel. This is, for example, a vehicle described in Japanese Patent Application Publication No. 2004-270891 (JP 2004-270891 A). JP 2004-270891 A describes that dog clutches each have a synchromesh mechanism. Each of the dog clutches couples a gear pair to an input shaft or output shaft of a transmission mechanism. Each of the dog clutches is operated to select a gear pair for transmitting power. When each dog clutch is operated, the corresponding synchromesh mechanism is used to synchronize rotation of the selected gear pair with rotation of the input shaft or output shaft of the transmission mechanism.

SUMMARY OF THE INVENTION

Incidentally, in each dog clutch equipped with the synchromesh mechanism, after a synchronizer ring is synchronized with a synchronized gear, spline teeth provided on the inner periphery of a sleeve are meshed with spline teeth provided on the synchronizer ring and further meshed with spline teeth provided on the synchronized gear as a result of movement of the sleeve. Thus, the dog clutch is engaged. When the dog clutch is engaged during a stop of a vehicle, the synchromesh mechanism may be operated in a state where rotations of both the upstream and downstream sides of a power transmission path in the dog clutch (for example, the sleeve and the synchronized gear) are stopped. In this case, in terms of the structure of the synchromesh mechanism, when the sleeve is moved to mesh the spline teeth, there may occur such an engagement fault of the dog clutch (synchromesh mechanism) that the spline teeth cannot be meshed with each other because the tooth tips of the spline teeth contact each other and, as a result, the dog clutch is not engaged. Such an engagement fault is called uplock. When such an uplock occurs, it is not possible to establish a desired gear stage (speed stage).

An aspect of the invention provides a control apparatus for a vehicle. The vehicle includes an engine, a dog clutch and a friction clutch. The dog clutch is configured to transmit power or interrupt transmission of power in a power transmission path that transmits power of the engine to a drive wheel. The dog clutch includes a synchromesh mechanism. The friction clutch is configured to transmit power or interrupt transmission of power in the power transmission path between the engine and the dog clutch. The control apparatus includes an electronic control unit. The electronic control unit is configured to, when the synchromesh mechanism is operated in order to engage the dog clutch in a state where the vehicle is stopped and the friction clutch is released, increase a rotation speed of the engine as compared to when the synchromesh mechanism is not operated.

With this configuration, when the synchromesh mechanism is operated, the rotation speed of an engine-side rotating member in the friction clutch is relatively increased. Thus, a dog clutch-side rotating member in the friction clutch is easily rotated by drag torque of the friction clutch. That is, when a differential rotation speed between the engine side and the dog clutch side in the friction clutch is increased by increasing the rotation speed of the engine-side rotating member in the friction clutch, shear torque of hydraulic oil in the friction clutch increases. Thus, drag torque of the friction clutch is increased, and the rotation speed of the dog clutch-side rotating member in the friction clutch is easily increased. When the dog clutch-side rotating member in the friction clutch is rotated, an engine (friction clutch)-side predetermined rotating member in the dog clutch (synchromesh mechanism) is rotated. Thus, it is possible to suppress occurrence of an uplock of the dog clutch even during a stop of the vehicle.

In the above aspect, the electronic control unit may be configured to, when the dog clutch is engaged along with start-up of the engine, i) set a predetermined lower limit value for the rotation speed of the engine and ii) control the rotation speed of the engine to the lower limit value or higher, until engagement of the dog clutch completes. With this configuration, when the synchromesh mechanism is operated along with start-up of the engine, the rotation speed of the engine after engine start-up is kept at the lower limit value or higher until engagement of the dog clutch completes, and the rotation speed of the engine-side rotating member in the friction clutch is kept at a certain level or higher. Thus, the dog clutch-side rotating member in the friction clutch is easily rotated by drag torque of the friction clutch. When the dog clutch-side rotating member in the friction clutch is rotated, the engine (friction clutch)-side rotating member in the dog clutch (synchromesh mechanism) is rotated. Thus, it is possible to suppress occurrence of an uplock of the dog clutch even during a stop of the vehicle.

In the above aspect, the electronic control unit may be configured to set the predetermined lower limit value for the rotation speed of the engine simultaneously with beginning of start-up of the engine. With this configuration, the rotation speed of the engine after completion of engine start-up is appropriately kept at the lower limit value or higher until engagement of the dog clutch completes, so the engine-side predetermined rotating member in the dog clutch is easily rotated.

In the above aspect, the electronic control unit may be configured to, when a rotation speed of a predetermined rotating member of the dog clutch is lower than or equal to a predetermined value after completion of start-up of the engine, set the predetermined lower limit value for the rotation speed of the engine, and the predetermined rotating member of the dog clutch may be arranged on the engine side. With this configuration, the rotation speed of the engine after completion of engine start-up is kept at the lower limit value or higher until engagement of the dog clutch completes, so the engine-side predetermined rotating member in the dog clutch is easily rotated at the rotation speed beyond the predetermined value.

In the above aspect, the electronic control unit may be configured to, when a rotation speed of a predetermined rotating member of the dog clutch becomes lower than or equal to a predetermined value as a result of a decrease in the rotation speed of the engine, which has increased in process of start-up of the engine, set the predetermined lower limit value to a value obtained by adding a predetermined correction value to the rotation speed of the engine at the time when the rotation speed of the predetermined rotating member becomes lower than or equal to the predetermined value, and the predetermined rotating member of the dog clutch may be arranged on the engine side. With this configuration, the engine-side predetermined rotating member in the dog clutch is easily rotated at the rotation speed beyond the predetermined value.

In the above aspect, the electronic control unit may be configured to, when a rotation speed of a predetermined rotating member of the dog clutch is lower than or equal to a predetermined value at the time when engagement of the dog clutch is started, update the predetermined lower limit value with a value higher than a value before engagement of the dog clutch is started, and the predetermined rotating member of the dog clutch may be arranged on the engine side. With this configuration, the engine-side predetermined rotating member in the dog clutch is easily rotated at the rotation speed beyond the predetermined value.

In the above aspect, the electronic control unit may be configured to, when an engagement fault has been detected in process of engagement of the dog clutch, update the predetermined lower limit value with a value higher than a value at timing at which the engagement fault of the dog clutch has been detected. With this configuration, the engine-side predetermined rotating member in the dog clutch is easily rotated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a view for illustrating changes in driving pattern of a power transmission system;

DETAILED DESCRIPTION OF EMBODIMENTS

In a present embodiment, suitably, a vehicle further includes a first transmission mechanism, a second transmission mechanism, and a first clutch mechanism. The first transmission mechanism and the second transmission mechanism are provided in parallel with each other between an engine and a drive wheel. The first clutch mechanism transmits power or interrupts transmission of power in a first power transmission path. The first power transmission path transmits power of the engine to the drive wheel via the first transmission mechanism. A power transmission path in which power is transmitted or transmission of power is interrupted by a dog clutch equipped with a synchromesh mechanism is a second power transmission path. The second power transmission path transmits power of the engine to the drive wheel via the second transmission mechanism. The first transmission mechanism is a known belt-type continuously variable transmission. Instead, a transmission of another type, such as a known planetary gear-type automatic transmission and a known traction-type continuously variable transmission, may be employed as the first transmission mechanism. The second transmission mechanism is an intermesh gear mechanism by which a single gear ratio or multiple gear ratios are established. Power of the engine is transmitted to the first transmission mechanism and the second transmission mechanism via a fluid transmission device. A known forward/reverse switching device provided in series with the second transmission mechanism is provided in parallel with the first transmission mechanism. A friction clutch that transmits power or interrupts transmission of power in a power transmission path between the engine and the dog clutch is one of elements that constitute the forward/reverse switching device. The engaged or released state of the dog clutch is changed by moving a sleeve in an axial direction by an actuator. A hydraulic actuator, an electric actuator, or the like, may be used as the actuator. The first clutch mechanism is a known hydraulic or electromagnetic friction clutch. The dog clutch (which may be not equipped with a synchromesh mechanism) may be employed as the first clutch mechanism. For example, the engine is an internal combustion engine, such as a gasoline engine and a diesel engine. Another prime motor, such as an electric motor, may be employed in combination with the engine as a driving force source.

Hereinafter, embodiments of the invention will be described in detail with reference to the accompanying drawings.

First Embodiment

Figure 1:
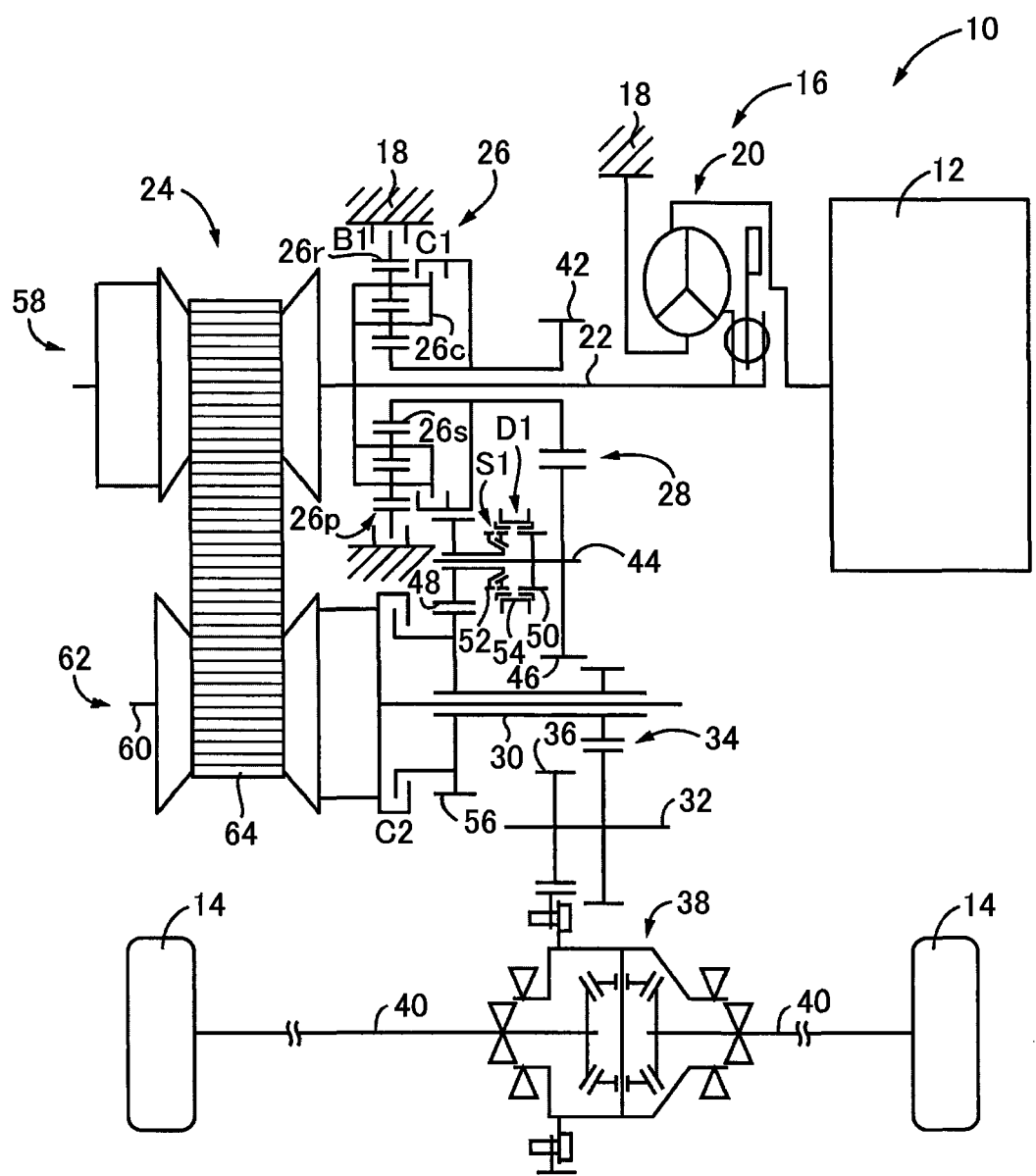
FIG. 1 is a view that illustrates the schematic configuration of a vehicle to which the invention is applied.

FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is provided integrally with a turbine shaft that is an output rotating member of the torque converter 20. The continuously variable transmission 24 is a continuously variable transmission mechanism coupled to the input shaft 22, and serves as a first transmission mechanism. The forward/reverse switching device 26 is coupled to the input shaft 22. The gear mechanism 28 is coupled to the input shaft 22 via the forward/reverse switching device 26, and is provided in parallel with the continuously variable transmission 24. The gear mechanism 28 serves as a second transmission mechanism. The output shaft 30 is an output rotating member common to the continuously variable transmission 24 and the gear mechanism 28. The reduction gear unit 34 is formed of a pair of gears that are respectively provided on the output shaft 30 and the counter shaft 32 so as to be relatively non-rotatable and that are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, power of the engine 12 (when not specifically distinguished from one another, power is synonymous with torque and force) is transmitted to the pair of drive wheels 14 sequentially via the torque converter 20, the continuously variable transmission 24 or gear mechanism 28, the reduction gear unit 34, the differential gear 38, the axles 40, and the like.

In this way, the power transmission system 16 includes the continuously variable transmission 24 and the gear mechanism 28 provided in parallel with each other between the engine 12 (which means the same as the input shaft 22 that is an input rotating member common to the continuously variable transmission 24 and the gear mechanism 28) and the drive wheels 14 (which mean the same as the output shaft 30). Thus, the power transmission system 16 includes a first power transmission path and a second power transmission path. The first power transmission path transmits the power of the engine 12 from the input shaft 22 toward the drive wheels 14 (that is, the output shaft 30) via the continuously variable transmission 24. The second power transmission path transmits the power of the engine 12 from the input shaft 22 toward the drive wheels 14 (that is, the output shaft 30) via the gear mechanism 28. The power transmission system 16 is configured to change the power transmission path from the engine 12 to the drive wheels 14 on the basis of a traveling state of the vehicle 10. Therefore, the power transmission system 16 includes a belt driving clutch C2 and a dog clutch D1. The belt driving clutch C2 transmits power or interrupts transmission of power in the first power transmission path, and serves as a first clutch mechanism. The dog clutch D1 transmits power or interrupts transmission of power in the second power transmission path, and serves as a second clutch mechanism.

The forward/reverse switching device 26 is mainly formed of a double-pinion-type planetary gear train 26$p$, a forward clutch C1 and a reverse brake B1. A carrier 26$c$ of the planetary gear train 26$p$ is integrally coupled to the input shaft 22. A ring gear 26$r$ of the planetary gear train 26$p$ is selectively coupled to the housing 18 via the reverse brake B1. A sun gear 26$s$ of the planetary gear train 26$p$ is coupled to a small-diameter gear 42. The small-diameter gear 42 is provided around the input shaft 22 coaxially with the input shaft 22 so as to be relatively rotatable. The carrier 26$c$ and the sun gear 26$s$ are selectively coupled to each other via the forward clutch C1. Each of the forward clutch C1 and the reverse brake B1 is an example of a separating device, and is a known hydraulic wet-type friction engagement device (friction clutch) that is frictionally engaged by a hydraulic actuator. In the thus configured forward/reverse switching device 26, when the forward clutch C1 is engaged and the reverse brake B1 is released, the input shaft 22 is directly coupled to the small-diameter gear 42, and a forward power transmission path is established (achieved) in the second power transmission path. When the reverse brake B1 is engaged and the forward clutch C1 is released, the small-diameter gear 42 is rotated in a direction opposite to the rotation direction of the input shaft 22, and a reverse power transmission path is established in the second power transmission path. When both the forward clutch C1 and the reverse brake B1 are released, the second power transmission path is set to a neutral state in which transmission of power is interrupted (power transmission interrupted state). Because the forward/reverse switching device 26 is interposed in the second power transmission path between the input shaft 22 and the dog clutch D1, the forward clutch C1 and the reverse brake B1 function as a third clutch mechanism provided in the power transmission system 16. The third clutch mechanism transmits power or interrupts transmission of power in the second power transmission path. In other words, the third clutch mechanism transmits power or interrupts transmission of power in the second power transmission path between the engine 12 and the dog clutch D1.

The gear mechanism 28 includes the small-diameter gear 42 and a large-diameter gear 46. The large-diameter gear 46 is provided on a gear mechanism counter shaft 44 so as to be relatively non-rotatable. An idler gear 48 is provided around the gear mechanism counter shaft 44 coaxially with the gear mechanism counter shaft 44 so as to be relatively rotatable. The dog clutch D1 is provided around the gear mechanism counter shaft 44 between the gear mechanism counter shaft 44 and the idler gear 48, and selectively connects the gear mechanism counter shaft 44 to the idler gear 48 or disconnects the gear mechanism counter shaft 44 from the idler gear 48. Specifically, the dog clutch D1 includes a first gear 50, a second gear 52 and a hub sleeve 54. The first gear 50 is formed on the gear mechanism counter shaft 44. The second gear 52 is formed on the idler gear 48. Internal teeth are formed in the hub sleeve 54, and are fittable (engageable, meshable) to these first gear 50 and second gear 52. In the thus configured dog clutch D1, when the hub sleeve 54 is fitted to these first gear 50 and second gear 52, the gear mechanism counter shaft 44 is connected to the idler gear 48. The dog clutch D1 further includes a synchromesh mechanism S1 that serves as a synchronization mechanism. The synchromesh mechanism S1 synchronizes rotations at the time when the hub sleeve 54 is fitted to the first gear 50 and the second gear 52. The idler gear 48 is in mesh with an output gear 56 having a larger diameter than the idler gear 48. The output gear 56 is provided around the same rotation axis as that of the output shaft 30 so as to be relatively non-rotatable with respect to the output shaft 30. When one of the forward clutch C1 and the reverse brake B1 is engaged and the dog clutch D1 is engaged, the second power transmission path is established (connected). In the second power transmission path, power of the engine 12 is transmitted from the input shaft 22 to the output shaft 30 sequentially via the forward/reverse switching device 26, the gear mechanism 28, the idler gear 48 and the output gear 56.

The continuously variable transmission 24 is provided in a power transmission path between the input shaft 22 and the output shaft 30. The continuously variable transmission 24 includes a primary pulley 58, a secondary pulley 62 and a transmission belt 64. The primary pulley 58 is provided on the input shaft 22, and has a variable effective diameter. The secondary pulley 62 is provided on a rotary shaft 60 coaxial with the output shaft 30, and has a variable effective diameter. The transmission belt 64 is wound around the pair of variable pulleys 58, 62. The continuously variable transmission 24 transmits power via friction force between the pair of variable pulleys 58, 62 and the transmission belt 64. In the continuously variable transmission 24, the V-groove width of each of the pair of variable pulleys 58, 62 changes, and the winding diameter (effective diameter) of the transmission belt 64 is changed. Thus, a speed ratio (gear ratio) $\gamma$ (=Input shaft rotation speed Ni/Output shaft rotation speed No) is continuously changed. For example, when the V-groove width of the primary pulley 58 is reduced, the gear ratio $\gamma$ reduces (that is, the continuously variable transmission 24 is upshifted). When the V-groove width of the primary pulley 58 is increased, the gear ratio $\gamma$ increases (that is, the continuously variable transmission 24 is downshifted). The output shaft 30 is arranged around the rotary shaft 60 coaxially with the rotary shaft 60 so as to be relatively rotatable. The belt driving clutch C2 is provided on the drive wheels 14 side with respect to the continuously variable transmission 24, and selectively connects the secondary pulley 62 to the output shaft 30 or disconnects the secondary pulley 62 from the output shaft 30. That is, the belt driving clutch C2 is provided between the secondary pulley 62 and the output shaft 30. When the belt driving clutch C2 is engaged, the first power transmission path is established (connected). In the first power transmission path, power of the engine 12 is transmitted from the input shaft 22 to the output shaft 30 via the continuously variable transmission 24.

The operation of the power transmission system 16 will be described below. FIG. 2 is a view for illustrating changes in driving pattern of the power transmission system 16 by using an engagement chart of engagement elements for each driving pattern. In FIG. 2, C1 corresponds to the operation state of the forward clutch C1, C2 corresponds to the operation state of the belt driving clutch C2, B1 corresponds to the operation state of the reverse brake B1, D1 corresponds to the operation state of the dog clutch D1, "O" indicates an engaged (connected) state, and "x" indicates a released (disconnected) state.

Initially, a gear driving mode that is the driving pattern in which power of the engine 12 is transmitted to the output shaft 30 via the gear mechanism 28 (that is, the driving pattern in which power is transmitted via the second power transmission path) will be described. In this gear driving mode, as shown in FIG. 2, for example, the forward clutch C1 and the dog clutch D1 are engaged, while the belt driving clutch C2 and the reverse brake B1 are released.

Specifically, when the forward clutch C1 is engaged, the planetary gear train 26p that constitutes the forward/reverse switching device 26 is integrally rotated, so the small-diameter gear 42 is rotated at the same rotation speed as the input shaft 22. Because the small-diameter gear 42 is in mesh with the large-diameter gear 46 provided on the gear mechanism counter shaft 44, the gear mechanism counter shaft 44 is also similarly rotated. Because the dog clutch D1 is engaged, the gear mechanism counter shaft 44 and the idler gear 48 are connected to each other. Because the idler gear 48 is in mesh with the output gear 56, the output shaft 30 provided integrally with the output gear 56 is rotated. In this way, when the forward clutch C1 and the dog clutch D1 are engaged, power of the engine 12 is transmitted to the output shaft 30 sequentially via the torque converter 20, the forward/reverse switching device 26, the gear mechanism 28, the idler gear 48, and the like. In this gear driving mode, for example, when the reverse brake B1 and the dog clutch D1 are engaged, and the belt driving clutch C2 and the forward clutch C1 are released, reverse traveling is enabled.

Subsequently, a belt driving mode that is the driving pattern in which power of the engine 12 is transmitted to the output shaft 30 via the continuously variable transmission 24 (that is, the driving pattern in which power is transmitted via the first power transmission path) will be described. In this belt driving mode, as shown in the belt driving mode (high vehicle speed) of FIG. 2, for example, the belt driving clutch C2 is engaged, while the forward clutch C1, the reverse brake B1 and the dog clutch D1 are released.

Specifically, when the belt driving clutch C2 is engaged, the secondary pulley 62 is connected to the output shaft 30, so the secondary pulley 62 and the output shaft 30 are integrally rotated. In this way, when the belt driving clutch C2 is engaged, power of the engine 12 is transmitted to the output shaft 30 sequentially via the torque converter 20, the continuously variable transmission 24, and the like. The reason why the dog clutch D1 is released during the belt driving mode (high vehicle speed) is to, for example, eliminate a drag of the gear mechanism 28, and the like, during the belt driving mode and prevent high rotation of the gear mechanism 28, and the like, at a high vehicle speed.

The gear driving mode is, for example, selected in a low vehicle speed region including a state during a stop of the vehicle. A gear ratio $\gamma 1$ (that is, a gear ratio established by the gear mechanism 28) in this second power transmission path is set to a value (that is, a low-side gear ratio) larger than a maximum gear ratio (that is, the lowest gear ratio that is the lowest vehicle speed-side gear ratio) $\gamma$max that is established by the continuously variable transmission 24. For example, the gear ratio $\gamma 1$ corresponds to a first speed gear ratio that is the gear ratio of a first gear stage in the power transmission system 16, and the lowest gear ratio $\gamma$ max of the continuously variable transmission 24 corresponds to a second speed gear ratio that is the gear ratio of a second gear stage in the power transmission system 16. Therefore, for example, the gear driving mode and the belt driving mode are changed in accordance with a shift line for changing between the first gear stage and the second gear stage in a shift map of a known stepped transmission. For example, in the belt driving mode, the gear ratio $\gamma$ is changed on the basis of a traveling state, such as an accelerator operation amount $\theta$acc and a vehicle speed V, by using a known method. In changing the driving pattern from the gear driving mode to the belt driving mode (high vehicle speed) or changing the driving pattern from the belt driving mode (high vehicle speed) to the gear driving mode, the change is carried out via a belt driving mode (intermediate vehicle speed) shown in FIG. 2 transitionally.

For example, when the driving pattern is changed from the gear driving mode to the belt driving mode (high vehicle speed), the operation state is transitionally changed from the state where the forward clutch C1 and the dog clutch D1, corresponding to the gear driving mode, are engaged to the belt driving mode (intermediate vehicle speed) that is the state where the belt driving clutch C2 and the dog clutch D1 are engaged. That is, a clutch engagement changing shift (for example, clutch-to-clutch shift) is carried out so as to release the forward clutch C1 and engage the belt driving clutch C2. At this time, the power transmission path is changed from the second power transmission path to the first power transmission path, and the power transmission system 16 is substantially upshifted. After the power transmission path is changed, the dog clutch D1 is released in order to prevent an unnecessary drag or high rotation of the gear mechanism 28, or the like (see interruption of driven input in FIG. 2). In this way, the dog clutch D1 functions as a driven input interrupting clutch that interrupts input from the drive wheels 14 side.

For example, when the driving pattern is changed from the belt driving mode (high vehicle speed) to the gear driving mode, the operation state is further transitionally changed from the state where the belt driving clutch C2 is engaged to the belt driving mode (intermediate vehicle speed) that is the state where the dog clutch D1 is engaged in preparation for changing the driving pattern into the gear driving mode (see downshift preparation in FIG. 2). In the belt driving mode (intermediate vehicle speed), rotation is also transmitted to the sun gear 26s of the planetary gear train 26p via the gear mechanism 28. When a clutch engagement changing shift (for example, clutch-to-clutch shift) is carried out so as to release the belt driving clutch C2 and engage the forward clutch C1 from the state of the belt driving mode (intermediate vehicle speed), the driving pattern is changed to the gear driving mode. At this time, the power transmission path is changed from the first power transmission path to the second power transmission path, and the power transmission system 16 is substantially downshifted.

Figure 3A:
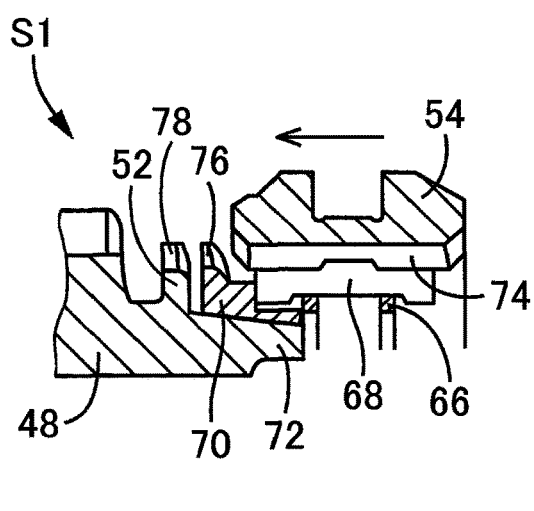
FIG. 3A and FIG. 3B are views that illustrate the configuration and operation of a synchromesh mechanism, and that show a state where a dog clutch is released.
Figure 3B:
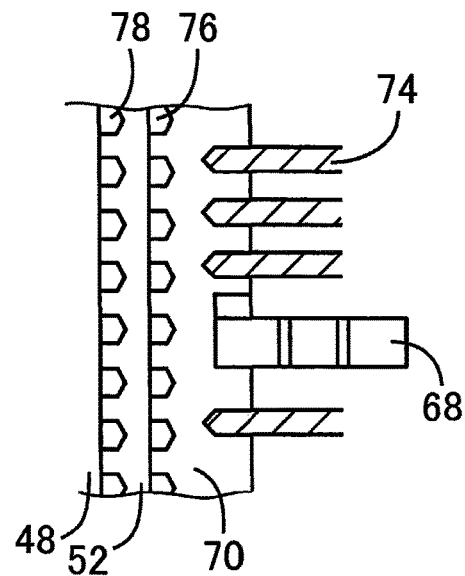
Figure 4A:
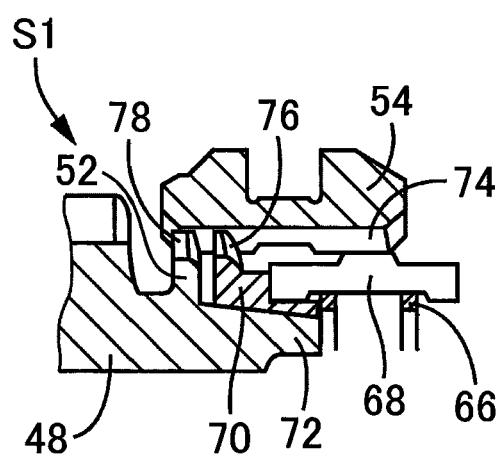
FIG. 4A and FIG. 4B are views that illustrate the configuration and operation of the synchromesh mechanism, and that show a state where the dog clutch is engaged.
Figure 4B:
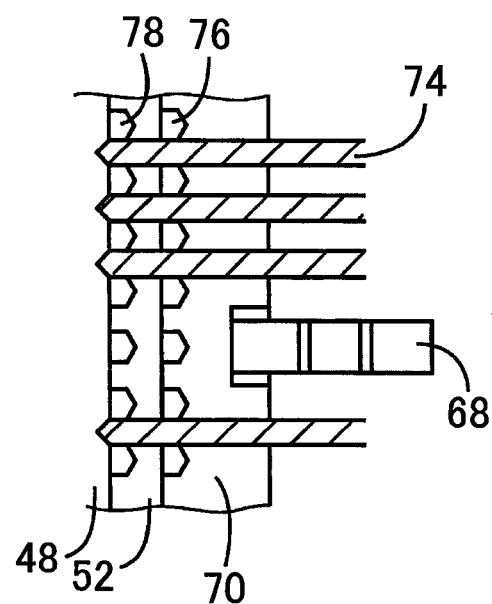

FIG. 3A, FIG. 3B, FIG. 4A and FIG. 4B are views for illustrating the configuration and operation of the synchromesh mechanism S1. FIG. 3A and FIG. 3B show a state where the dog clutch D1 is released. FIG. 4A and FIG. 4B show a state where the dog clutch D1 is engaged. FIG. 3A and FIG. 4A are cross-sectional views of the synchromesh mechanism S1. FIG. 3B and FIG. 4B are developed views excluding a cylindrical portion of the hub sleeve 54 when the states of FIG. 3A and FIG. 4A are viewed from the radially outer side. As shown in FIG. 3A, the synchromesh mechanism S1 includes a key spring 66, a shifting key 68, a synchronizer ring 70 and a cone portion 72. The shifting key 68 is engaged with the hub sleeve 54 by the key spring 66. The synchronizer ring 70 is rotated together with the shifting key 68 with a predetermined play. The cone portion 72 is provided on the second gear 52. Spline teeth 74 that serve as internal teeth are provided on the inner periphery of the hub sleeve 54. The spline teeth 74 are spine-fitted to the first gear 50. The hub sleeve 54 is constantly integrally rotated together with the first gear 50. When the hub sleeve 54 is moved leftward in the drawing, the synchronizer ring 70 is pressed against the cone portion 72 via the shifting key 68, and power is transmitted to the second gear 52 by friction therebetween. When the hub sleeve 54 is further moved leftward, the spline teeth 74 are meshed with the spline teeth 76 provided on the synchronizer ring 70 and the spline teeth 78 provided on the second gear 52, as shown in FIG. 4A and FIG. 4B. Thus, the first gear 50 and the second gear 52 are integrally connected, and the power transmission path is established between the forward/reverse switching device 26 and the output shaft 30.

Figure 5:
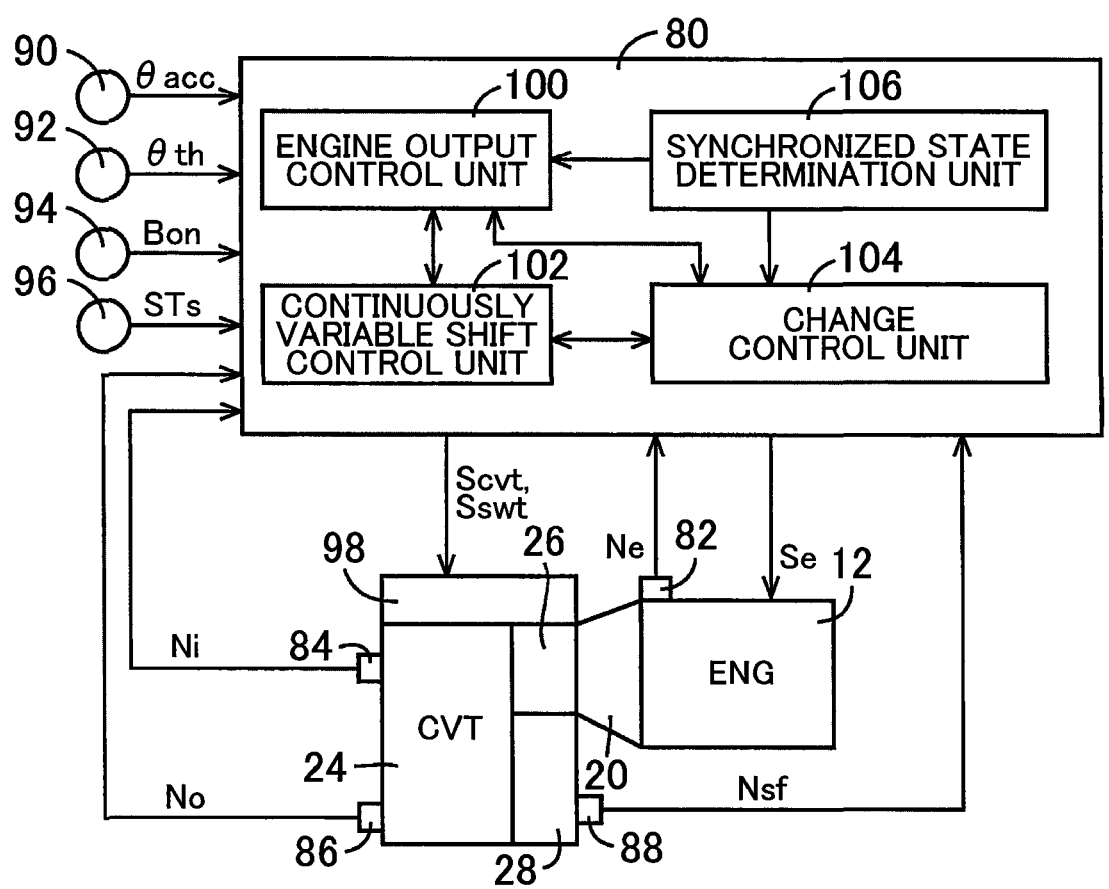
FIG. 5 is a view that illustrates a relevant portion of control functions and control system for various controls in the vehicle.

FIG. 5 is a view that illustrates a relevant portion of control functions and control system for various controls in the vehicle 10. As shown in FIG. 5, the vehicle 10 includes an electronic control unit 80 including, for example, a control unit for the vehicle 10. The control unit operates the synchromesh mechanism S1 in order to change the dog clutch D1 between the engaged state and the released state. Thus, FIG. 5 is a view that shows input/output lines of the electronic control unit 80, and is a functional block diagram that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 80 is configured to execute output control over the engine 12, shift control and belt clamping force control over the continuously variable transmission 24, control for changing the driving pattern, and the like. Where necessary, the electronic control unit 80 is split into an electronic control unit for controlling the engine, an electronic control unit for controlling the continuously variable transmission, an electronic control unit for changing the driving pattern, and the like.

Various actual values based on detected signals by various sensors are supplied to the electronic control unit 80. The various sensors include, for example, various rotation speed sensors 82, 84, 86, 88, an accelerator operation amount sensor 90, a throttle valve opening degree sensor 92, a foot brake switch 94, a stroke sensor 96, and the like. The various actual values include, for example, an engine rotation speed Ne, an input shaft rotation speed Ni, an output shaft rotation speed No, a synchromesh upstream rotation speed Nsf, the accelerator operation amount θacc, a throttle valve opening degree θth, a brake on signal Bon, a synchronization stroke STs, and the like. The input shaft rotation speed Ni corresponds to a turbine rotation speed Nt or the rotation speed of the primary pulley 58. The output shaft rotation speed No corresponds to the vehicle speed V or the rotation speed of the secondary pulley 62. The synchromesh upstream rotation speed Nsf is the rotation speed of the gear mechanism counter shaft 44. The rotation speed of the gear mechanism counter shaft 44 corresponds to the rotation speed of, for example, the first gear 50. The first gear 50 serves as an engine 12-side predetermined rotating member in the dog clutch D1. The accelerator operation amount θacc is the operation amount of an accelerator pedal, which is a driver's required acceleration amount. The brake on signal Bon is a signal indicating a state where a foot brake that is a service brake is operated. The synchronization stroke STs is a moving position (moving distance) of an actuator that actuates the hub sleeve 54, and corresponds to positional information about the hub sleeve 54 between a released-side endmost position of the hub sleeve 54 and an engaged-side endmost position of the hub sleeve 54. The hub sleeve 54 is located at the released-side endmost position when the dog clutch D1 is set to the released state. The hub sleeve 54 is located at the engaged-side endmost position when the dog clutch D1 is set to the engaged state.

An engine output control command signal Se, a hydraulic control command signal Scvt, a hydraulic control command signal Sswt, and the like, are output from the electronic control unit 80. The engine output control command signal Se is used for output control over the engine 12. The hydraulic control command signal Scvt is used for hydraulic control associated with a shift of the continuously variable transmission 24. The hydraulic control command signal Sswt is used to control the forward/reverse switching device 26, the belt driving clutch C2 and the dog clutch D1 associated with a change of the driving pattern of the power transmission system 16. Specifically, a throttle signal, an injection signal, an ignition timing signal, and the like, are output as the engine output control command signal Se. The throttle signal is used to control the open/close of the electronic throttle valve by driving a throttle actuator. The injection signal is used to control the amount of fuel that is injected from a fuel injection device. The ignition timing signal is used to control the ignition timing of the engine 12 by an ignition device. A command signal for driving a solenoid valve that regulates a primary pressure Pin, a command signal for driving a solenoid valve that regulates a secondary pressure Pout, and the like, are output to a hydraulic control circuit 98 as the hydraulic control command signal Scvt. The primary pressure Pin is supplied to the actuator of the primary pulley 58. The secondary pressure Pout is supplied to the actuator of the secondary pulley 62. Command signals, and the like, for respectively driving solenoid valves that control hydraulic pressures that are supplied to the forward clutch C1, the reverse brake B1, the belt driving clutch C2, the actuator for actuating the hub sleeve 54 (synchromesh mechanism S1), and the like, are output to the hydraulic control circuit 98 as the hydraulic control command signal Sswt.

The electronic control unit 80 includes an engine output control unit 100, that is, engine output control means, a continuously variable shift control unit 102, that is, continuously variable shift control means, and a change control unit 104, that is, change control means.

The engine output control unit 100, for example, outputs the engine output control command signal Se to the throttle actuator, the fuel injection device and the ignition device in order to execute output control over the engine 12. The engine output control unit 100, for example, sets a target engine torque Tetgt for obtaining a required driving force (which means the same as a required driving torque) on the basis of the accelerator operation amount θacc and the vehicle speed V. The engine output control unit 100 controls not only the open/close of the electronic throttle valve by the throttle actuator but also the fuel injection amount by the fuel injection device and the ignition timing by the ignition device so that the target engine torque Tetgt is obtained.

The continuously variable shift control unit 102 controls the gear ratio γ of the continuously variable transmission 24 so that a target gear ratio γtgt is obtained in the belt driving mode. The target gear ratio γtgt is calculated on the basis of the accelerator operation amount θacc, the vehicle speed V, the brake on signal Bon, and the like. Specifically, the continuously variable shift control unit 102 determines a primary command pressure Pintgt and a secondary command pressure Pouttgt so that the target gear ratio γtgt of the continuously variable transmission 24 is achieved while a belt slip of the continuously variable transmission 24 does not occur. The target gear ratio γtgt is set such that the operating point of the engine 12 is on an optimal line. The primary command pressure Pintgt is a command value of the primary pressure Pin. The secondary command pressure Pouttgt is a command value of the secondary pressure Pout. The continuously variable shift control unit 102 outputs the primary command pressure Pintgt and the secondary command pressure Pouttgt to the hydraulic control circuit 98.

The change control unit 104 executes change control for changing the driving pattern between the gear driving mode and the belt driving mode as needed. In the gear driving mode, power of the engine 12 is transmitted to the output shaft 30 via the gear mechanism 28. In the belt driving mode, power of the engine 12 is transmitted to the output shaft 30 via the continuously variable transmission 24.

Specifically, the change control unit 104 determines whether to change the driving pattern in which the vehicle is traveling. For example, the change control unit 104 determines whether to shift (change the gear ratio) on the basis of the vehicle speed V and the accelerator operation amount θce by using an upshift line and a downshift line for changing the gear ratio between the first speed gear ratio and the second speed gear ratio, and, on the basis of the determined result, determines whether to change the driving pattern in which the vehicle is traveling. The first speed gear ratio corresponds to the gear ratio γ1 in the gear driving mode. The second speed gear ratio corresponds to the lowest gear ratio γ max in the belt driving mode. The upshift line and the downshift line are, for example, empirically obtained or obtained by design and stored in advance (that is, predetermined) shift lines, and have a predetermined hysteresis.

When the change control unit 104 determines to change the driving pattern, the change control unit 104 changes the driving pattern. For example, when the change control unit 104 determines to upshift during traveling in the gear driving mode, the change control unit 104 changes the driving pattern from the gear driving mode to the belt driving mode (high vehicle speed). When the change control unit 104 changes the driving pattern from the gear driving mode to the belt driving mode (high vehicle speed), the change control unit 104 initially carries out an upshift through a clutch-to-clutch shift for releasing the forward clutch C1 and engaging the belt driving clutch C2. This state corresponds to the belt driving mode (intermediate vehicle speed) into which the driving pattern is transitionally changed in FIG. 2. The power transmission path in the power transmission system 16 changes from the second power transmission path, through which power is transmitted via the gear mechanism 28, to the first power transmission path, through which power is transmitted via the continuously variable transmission 24. Subsequently, the change control unit 104 changes the driving pattern into the belt driving mode (high vehicle speed) by outputting a command to actuate the hub sleeve 54 of the synchromesh mechanism S1 so that the engaged dog clutch D1 is released. The hub sleeve 54 is driven by a hydraulic actuator (not shown), and a pressing force that is applied to the hub sleeve 54 is adjusted by a hydraulic pressure (synchromesh hydraulic pressure, S1 hydraulic pressure) that is supplied to the hydraulic actuator.

When the change control unit 104 determines to downshift during traveling in the belt driving mode (high vehicle speed), the change control unit 104 changes the driving pattern from the belt driving mode (high vehicle speed) to the gear driving mode. When the change control unit 104 changes the driving pattern from the belt driving mode (high vehicle speed) to the gear driving mode, the change control unit 104 initially changes the driving pattern into the belt driving mode (intermediate vehicle speed) by outputting a command to actuate the hub sleeve 54 of the synchromesh mechanism S1 so that the released dog clutch D1 is engaged. Subsequently, the change control unit 104 carries out a downshift through a clutch-to-clutch shift for releasing the belt driving clutch C2 and engaging the forward clutch C1. This state corresponds to the gear driving mode in FIG. 2. The power transmission path in the power transmission system 16 is changed from the first power transmission path, through which power is transmitted via the continuously variable transmission 24, to the second power transmission path, through which power is transmitted via the gear mechanism 28. In this way, when the change control unit 104 changes the power transmission path from transmission of power via the continuously variable transmission 24 to transmission of power via the gear mechanism 28 while the vehicle 10 is traveling, the dog clutch D1 is actuated to be engaged and then the belt driving clutch C2 is released.

In control for transitionally changing the driving pattern into the belt driving mode (intermediate vehicle speed) as described above, the first power transmission path and the second power transmission path are changed only by exchanging torque through a clutch-to-clutch shift. Thus, a change shock is suppressed.

Incidentally, when the dog clutch D1 is controlled to be engaged at engine start-up from a vehicle stopped state where the engine 12 is stopped, both the reverse brake B1 and the forward clutch C1 are released, so the synchromesh mechanism S1 is operated in a state where both rotations of the upstream and downstream sides of the dog clutch D1 in the power transmission path (for example, the first gear 50 and the second gear 52) are stopped. When the synchromesh mechanism S1 is operated so as to engage the dog clutch D1 in such a state, there may occur an uplock. In the uplock, the tooth tips of the spline teeth 74 of the hub sleeve 54 and the tooth tips of the synchronizer ring 70 or the tooth tips of the spline teeth 78 of the second gear 52 contact (collide) with each other), with the result that the dog clutch D1 is not engaged.

In contrast, in the present embodiment, control operations of the electronic control unit 80 are suggested. The control operations reliably engage the dog clutch D1 by preventing occurrence of the uplock or eliminating the occurred uplock. That is, when the synchromesh mechanism S1 is operated in order to engage the dog clutch D1 along with start-up of the engine 12 in a state where the vehicle 10 is stopped and the friction clutches (that is, the reverse brake B1 and the forward clutch C1) are released, the electronic control unit 80 increases the engine rotation speed Ne as compared to when the synchromesh mechanism S1 is not operated. For example, when the dog clutch D1 is engaged along with start-up of the engine 12, the electronic control unit 80 sets a predetermined lower limit value Nelim for the engine rotation speed Ne and controls the engine rotation speed Ne to the predetermined lower limit value Nelim or higher, until engagement of the dog clutch D1 completes. This is to suppress or avoid occurrence of an uplock or make it easy to eliminate an occurred uplock in the following manner. The dog clutch D1-side rotating member in the forward clutch C1 is caused to rotate (that is, the forward/reverse switching device 26-side predetermined rotating member (for example, the first gear 50) in the dog clutch D1 is caused to rotate) as a result of a relative increase in the turbine rotation speed Nt (input shaft rotation speed Ni), caused by relatively increasing the engine rotation speed Ne, by using drag torque in the released forward clutch C1. In a vehicle stopped state where the engine 12 is stopped, of course, not only both the reverse brake B1 and the forward clutch C1 are released but also the belt driving clutch C2 is released.

Specifically, the electronic control unit 80 further includes a synchronized state determination unit 106, that is, synchronized state determination means. For example, when a command to actuate the hub sleeve 54 of the synchromesh mechanism S1 (for example, a command to apply a synchromesh hydraulic pressure) is output by the change control unit 104 so that the dog clutch D1 is engaged, the synchronized state determination unit 106 determines on the basis of the synchronization stroke STs whether engagement of the dog clutch D1 (synchromesh mechanism S1) has completed.

For example, when the engine output control unit 100 determines that engine start-up operation has been carried out by a driver, the engine output control unit 100 starts up the engine 12 by outputting a command to drive a starter (not shown). In addition, for example, when the dog clutch D1 is in the released state, the engine output control unit 100 sets the predetermined lower limit value Nelim for the engine rotation speed Ne simultaneously with start-up of the engine 12 (that is, simultaneously with the beginning of start-up of the engine 12). For example, when the engine output control unit 100 converges the blown-up engine rotation speed Ne, blown up as a result of start-up of the engine 12, to a steady rotation speed (for example, idle rotation speed), the engine output control unit 100 controls the engine rotation speed Ne to the predetermined lower limit value Nelim or higher while the predetermined lower limit value Nelim is set. The predetermined lower limit value Nelim is, for example, a rotation speed higher than the idle rotation speed. The predetermined lower limit value Nelim is a value determined in advance as the engine rotation speed Ne for causing the forward/reverse switching device 26-side predetermined rotating member (for example, the first gear 50) in the dog clutch D1 to rotate in a state where the friction clutches (that is, the reverse brake B1 and the forward clutch C1) are released.

For example, the change control unit 104 determines whether a predetermined time has elapsed from the beginning of start-up of the engine 12 by the engine output control unit 100. When the change control unit 104 determines that the predetermined time has elapsed from the beginning of start-up of the engine 12, the change control unit 104 outputs a command to actuate the hub sleeve 54 of the synchromesh mechanism S1 (for example, a command to apply the synchromesh hydraulic pressure) so that the dog clutch D1 is engaged. At the time when the synchromesh mechanism S1 is operated, the first gear 50 is rotated, so occurrence of an uplock is suppressed or avoided. The predetermined time is, for example, a synchromesh operation start determination time determined in advance as a time from the beginning of start-up of the engine 12, which is a time during which start-up of the engine 12 has completed and then the engine rotation speed Ne is kept at the predetermined lower limit value Nelim or higher.

For example, when the synchronized state determination unit 106 determines that engagement of the dog clutch D1 (synchromesh mechanism S1) has completed, the engine output control unit 100 cancels the predetermined lower limit value Nelim set for the engine rotation speed Ne.

Figure 6:
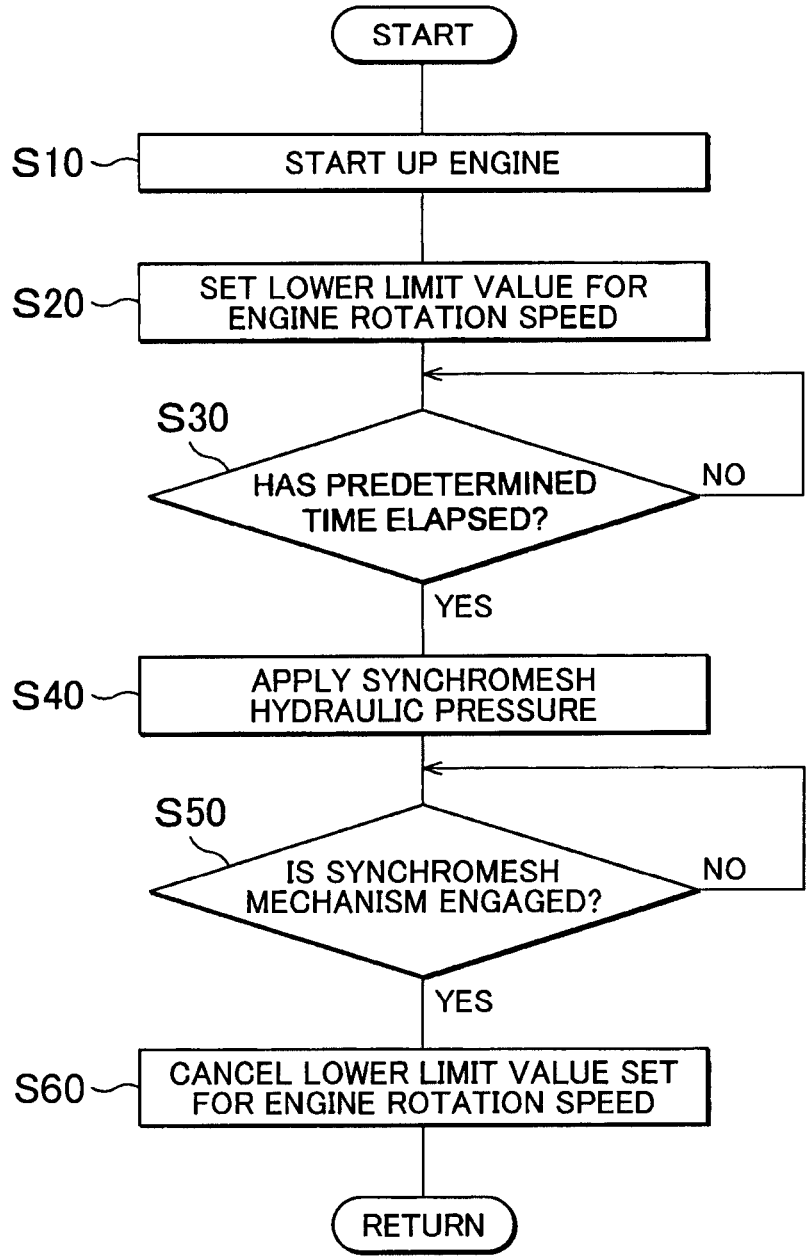
FIG. 6 is a flowchart that illustrates a relevant portion of control operations of an electronic control unit, that is, control operations for suppressing occurrence of an uplock of the dog clutch even during a stop of the vehicle.
Figure 7:
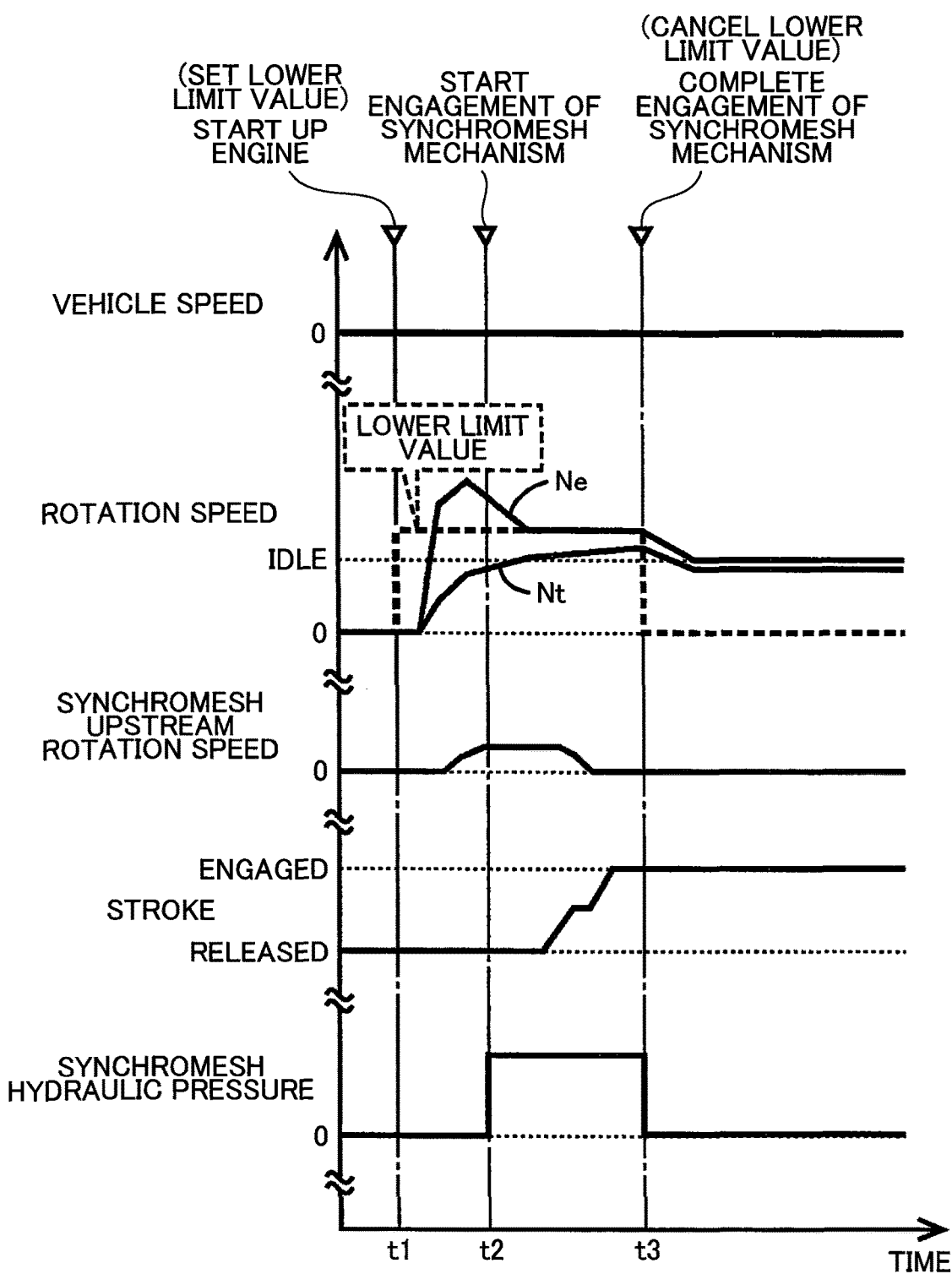
FIG. 7 is an example of a time chart in the case where the control operations shown in the flowchart of FIG. 6 are executed.

FIG. 6 is a flowchart that illustrates a relevant portion of control operations of the electronic control unit 80, that is, control operations for suppressing occurrence of an uplock of the dog clutch D1 even during a stop of the vehicle. This flowchart is repeatedly executed, for example, when an engine start-up request is issued. FIG. 7 is an example of a time chart in the case where the control operations shown in the flowchart of FIG. 6 are executed.

In FIG. 6, initially, step (hereinafter, step is omitted) S10 corresponding to the engine output control unit 100, for example, indicates that the engine 12 has been started up on the basis of an engine start-up request during a stop of the vehicle in which the engine 12 is stopped (see t1 timing in FIG. 7). Subsequently, in S20 corresponding to the engine output control unit 100, for example, when the dog clutch D1 is in the released state, the predetermined lower limit value Nelim is set for the engine rotation speed Ne simultaneously with the beginning of start-up of the engine 12 in S10 (see t1 timing in FIG. 7). Subsequently, in S30 corresponding to the change control unit 104, for example, it is determined whether the predetermined time has elapsed from the beginning of start-up of the engine 12. When negative determination is made in S30, S30 is repeatedly executed. When affirmative determination is made in S30, in S40 corresponding to the change control unit 104, for example, a command to operate the synchromesh mechanism S1 (for example, a command to apply the synchromesh hydraulic pressure) is output so that the released dog clutch D1 (synchromesh mechanism S1) is engaged (see t2 timing in FIG. 7). Subsequently, in S50 corresponding to the synchronized state determination unit 106, for example, it is determined on the basis of the synchronization stroke STs whether engagement of the dog clutch D1 (synchromesh mechanism S1) has completed. When negative determination is made in S50, S50 is repeatedly executed. When affirmative determination is made in S50, in S60 corresponding to the engine output control unit 100, for example, the predetermined lower limit value Nelim set for the engine rotation speed Ne in S20 is cancelled (see t3 timing in FIG. 7). As shown in FIG. 7, because the predetermined lower limit value Nelim is set for the engine rotation speed Ne during the period from t1 timing to t3 timing, the engine rotation speed Ne is kept at the predetermined lower limit value Nelim or higher, and the synchromesh upstream rotation speed Nsf has been increased from substantially zero at t2 timing at which operation of the synchromesh mechanism S1 is started. Thus, the dog clutch D1 (synchromesh mechanism S1) is appropriately engaged.

As described above, according to the present embodiment, when the synchromesh mechanism S1 is operated, the rotation speed (turbine rotation speed Nt) of the engine 12-side rotating member in any one of the friction clutches (that is, the reverse brake B1 and the forward clutch C1) is relatively increased by relatively increasing the engine rotation speed Ne. Thus, the dog clutch D1-side rotating member in the any one of the friction clutches is easily rotated by drag torque of the any one of the friction clutches. When the dog clutch D1-side rotating member in the any one of the friction clutches is rotated, the friction clutch-side predetermined rotating member in the dog clutch D1 (synchromesh mechanism S1) is rotated. Thus, it is possible to suppress occurrence of an uplock of the dog clutch D1 even during a stop of the vehicle.

According to the present embodiment, when the synchromesh mechanism S1 is operated along with start-up of the engine 12, the predetermined lower limit value Nelim is set for the engine rotation speed Ne until engagement of the dog clutch D1 completes, the engine rotation speed Ne after engine start-up is kept at the predetermined lower limit value Nelim or higher, and the rotation speed of the engine 12-side rotating member in the any one of the friction clutches is kept at a certain level or higher. Thus, the dog clutch D1-side rotating member in the any one of the friction clutches is easily rotated by drag torque of the any one of the friction clutches.

According to the present embodiment, the predetermined lower limit value Nelim is set for the engine rotation speed Ne simultaneously with the beginning of start-up of the engine 12. Thus, the engine rotation speed Ne after completion of engine start-up is appropriately kept at the predetermined lower limit value Nelim or higher until engagement of the dog clutch D1 completes, and the engine 12-side predetermined rotating member in the dog clutch D1 is easily rotated.

Next, other embodiments of the invention will be described. In the following description, like reference numerals denote portions common to the embodiments, and the description thereof is omitted.

Second Embodiment

In the first embodiment, for example, when the dog clutch D1 is in the released state, the engine output control unit 100 sets the predetermined lower limit value Nelim for the engine rotation speed Ne simultaneously with the beginning of start-up of the engine 12. Instead of the above embodiment, for example, when the dog clutch D1 is in the released state, the engine output control unit 100 sets the predetermined lower limit value Nelim for the engine rotation speed Ne when the rotation speed (synchromesh upstream rotation speed Nsf) of the engine 12-side (forward/reverse switching device 26-side) predetermined rotating member (for example, the first gear 50) in the dog clutch D1 is lower than or equal to a predetermined value K after completion of start-up of the engine 12. Therefore, in addition, for example, when the dog clutch D1 is in the released state, the synchronized state determination unit 106 according to the present embodiment determines whether the synchromesh upstream rotation speed Nsf is lower than or equal to the predetermined value K after completion of start-up of the engine 12. The predetermined value K is, for example, a value determined in advance as the sufficient synchromesh upstream rotation speed Nsf for suppressing or avoiding an uplock of the dog clutch D1. Thus, the predetermined time that is a threshold for determining an elapsed time from the beginning of start-up of the engine 12 is also, for example, a synchromesh operation start determination time determined in advance for making a determination that the synchromesh upstream rotation speed Nsf has increased sufficiently for suppressing or avoiding an uplock of the dog clutch D1 with an increase in the engine rotation speed Ne. The engine output control unit 100, for example, determines whether start-up of the engine 12 has completed on the basis of whether the engine 12 is autonomously operable after the beginning of start-up control over the engine 12.

Figure 8:
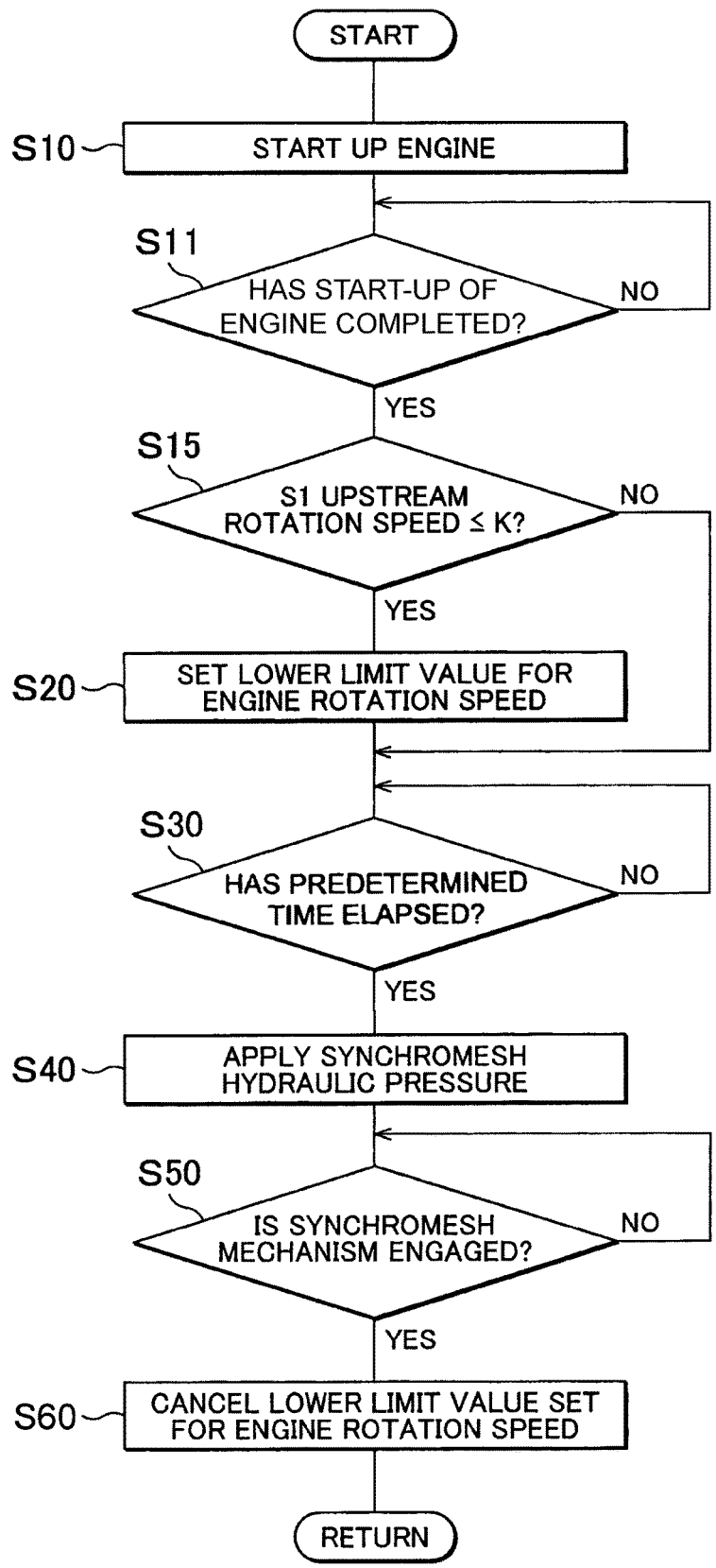
FIG. 8 is a flowchart that illustrates a relevant portion of control operations of the electronic control unit, that is, control operations for suppressing occurrence of an uplock of the dog clutch even during a stop of the vehicle, according to an embodiment different from that of FIG. 6.
Figure 9:
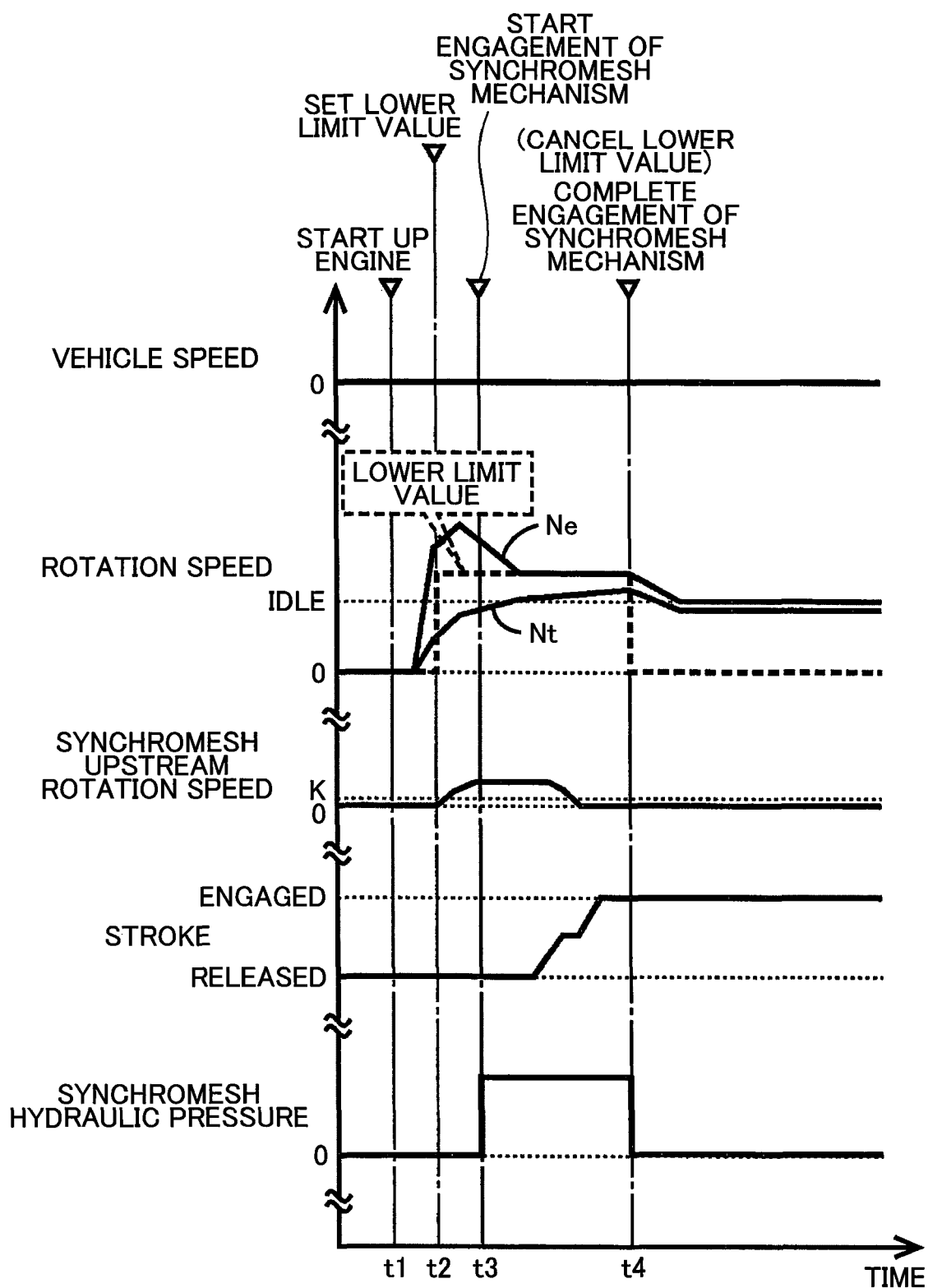
FIG. 9 is an example of a time chart in the case where the control operations shown in the flowchart of FIG. 8 are executed.

FIG. 8 is a flowchart that illustrates a relevant portion of control operations of the electronic control unit 80, that is, control operations for suppressing occurrence of an uplock of the dog clutch D1 even during a stop of the vehicle. This flowchart is repeatedly executed, for example, when the engine start-up request is issued. FIG. 9 is an example of a time chart in the case where the control operations shown in the flowchart of FIG. 8 are executed. FIG. 8 shows the embodiment different from FIG. 6. Hereinafter, portions different from FIG. 6 will be mainly described.

In FIG. 8, subsequent to S10, in S11 corresponding to the engine output control unit 100, for example, it is determined whether start-up of the engine 12 has completed. When negative determination is made in S11, S11 is repeatedly executed. When affirmative determination is made in S11, in S15 corresponding to the synchronized state determination unit 106, for example, when the dog clutch D1 is in the released state, it is determined whether the synchromesh upstream rotation speed Nsf is lower than or equal to the predetermined value K. When affirmative determination is made in S15, in S20 corresponding to the engine output control unit 100, for example, the predetermined lower limit value Nelim is set for the engine rotation speed Ne (see t2 timing in FIG. 9). When negative determination is made in S15 or subsequent to S20, in S30 corresponding to the change control unit 104, for example, it is determined whether the predetermined time has elapsed from the beginning of start-up of the engine 12. When negative determination is made in S30, S30 is repeatedly executed. When affirmative determination is made in S30, in S40 corresponding to the change control unit 104, for example, a command to operate the synchromesh mechanism S1 (for example, a command to apply the synchromesh hydraulic pressure) is output so that the released dog clutch D1 (synchromesh mechanism S1) is engaged (see t3 timing in FIG. 9). As shown in FIG. 9, because the synchromesh upstream rotation speed Nsf is lower than or equal to the predetermined value K after completion of start-up of the engine 12, the predetermined lower limit value Nelim is set for the engine rotation speed Ne during the period from t2 timing to t4 timing. Thus, the engine rotation speed Ne is kept at the predetermined lower limit value Nelim or higher, and the synchromesh upstream rotation speed Nsf has been increased beyond the predetermined value K at t3 timing at which operation of the synchromesh mechanism S1 is started. Thus, the dog clutch D1 (synchromesh mechanism S1) is appropriately engaged.

As described above, according to the present embodiment, similar advantageous effects to those of the above-described first embodiment are obtained. Particularly, when the synchromesh upstream rotation speed Nsf is lower than or equal to the predetermined value K after completion of start-up of the engine 12, the predetermined lower limit value Nelim is set for the engine rotation speed Ne. Thus, the engine rotation speed Ne after completion of engine start-up is appropriately kept at the predetermined lower limit value Nelim or higher until engagement of the dog clutch D1 completes, and the engine 12-side predetermined rotating member in the dog clutch D1 is easily rotated at the rotation speed beyond the predetermined value K.

Third Embodiment

In the above-described first and second embodiments, the predetermined lower limit value Nelim is a value determined in advance. Instead of the above embodiments, for example, when the synchromesh upstream rotation speed Nsf becomes lower than or equal to the predetermined value K as a result of a decrease in the engine rotation speed Ne that has increased in process of start-up of the engine 12 (that is, blown up as a result of start-up of the engine 12), the engine output control unit 100 according to the present embodiment sets a value ($=Ke+\alpha$), obtained by adding a predetermined correction value $\alpha$ to the engine rotation speed Ke at the time when the synchromesh upstream rotation speed Nsf becomes lower than or equal to the predetermined value K, as the predetermined lower limit value Nelim. Therefore, the engine output control unit 100, for example, determines whether the engine rotation speed Ne that has increased in process of start-up of the engine 12 has decreased. The predetermined correction value $\alpha$ is a correction amount determined in advance as the amount of increase in the engine rotation speed Ne in order for the synchromesh upstream rotation speed Nsf to exceed the predetermined value K.

Figure 10:
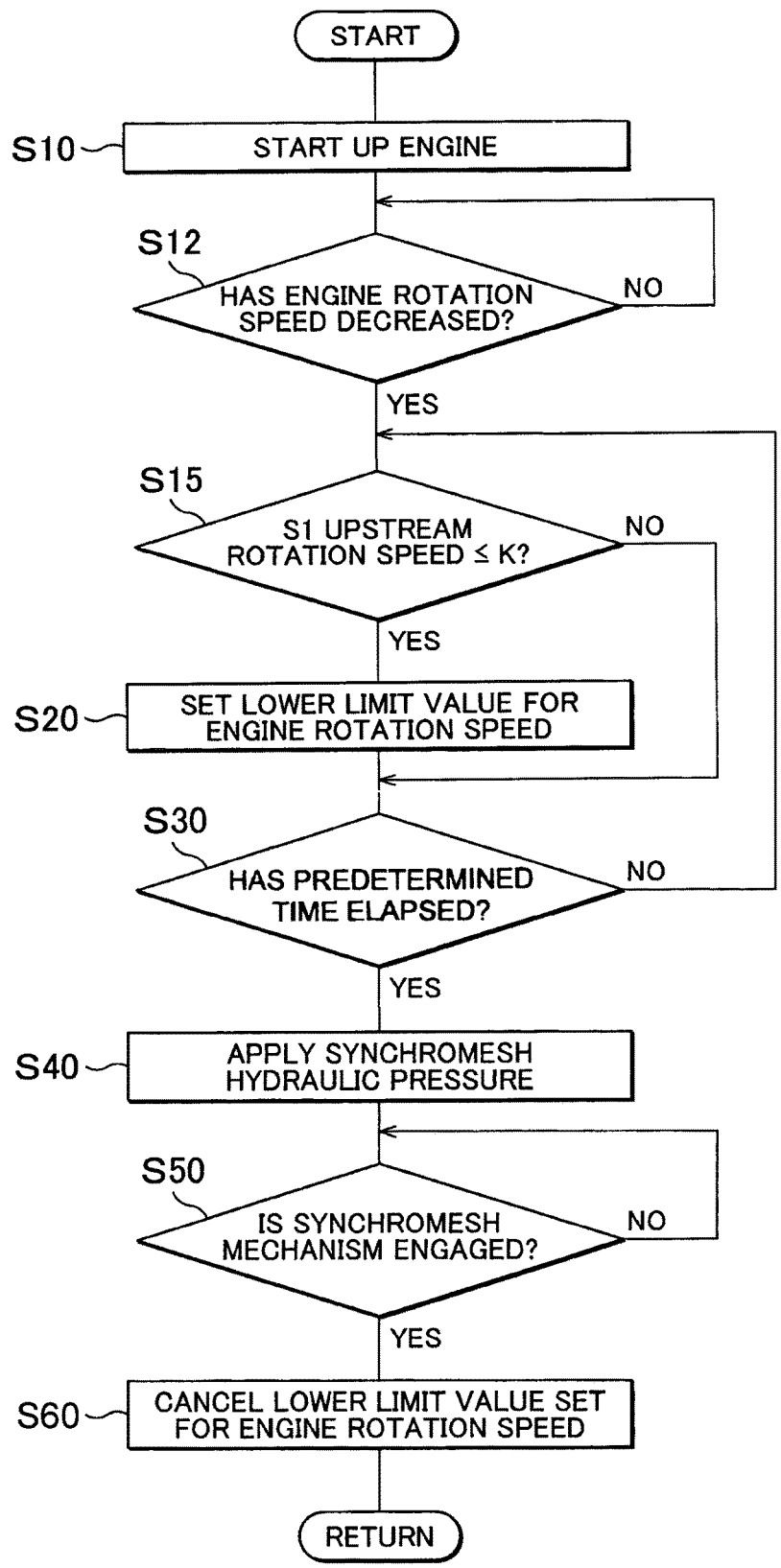
FIG. 10 is a flowchart that illustrates a relevant portion of control operations of the electronic control unit, that is, control operations for suppressing occurrence of an uplock of the dog clutch even during a stop of the vehicle, according to an embodiment different from that of FIG. 8.
Figure 11:
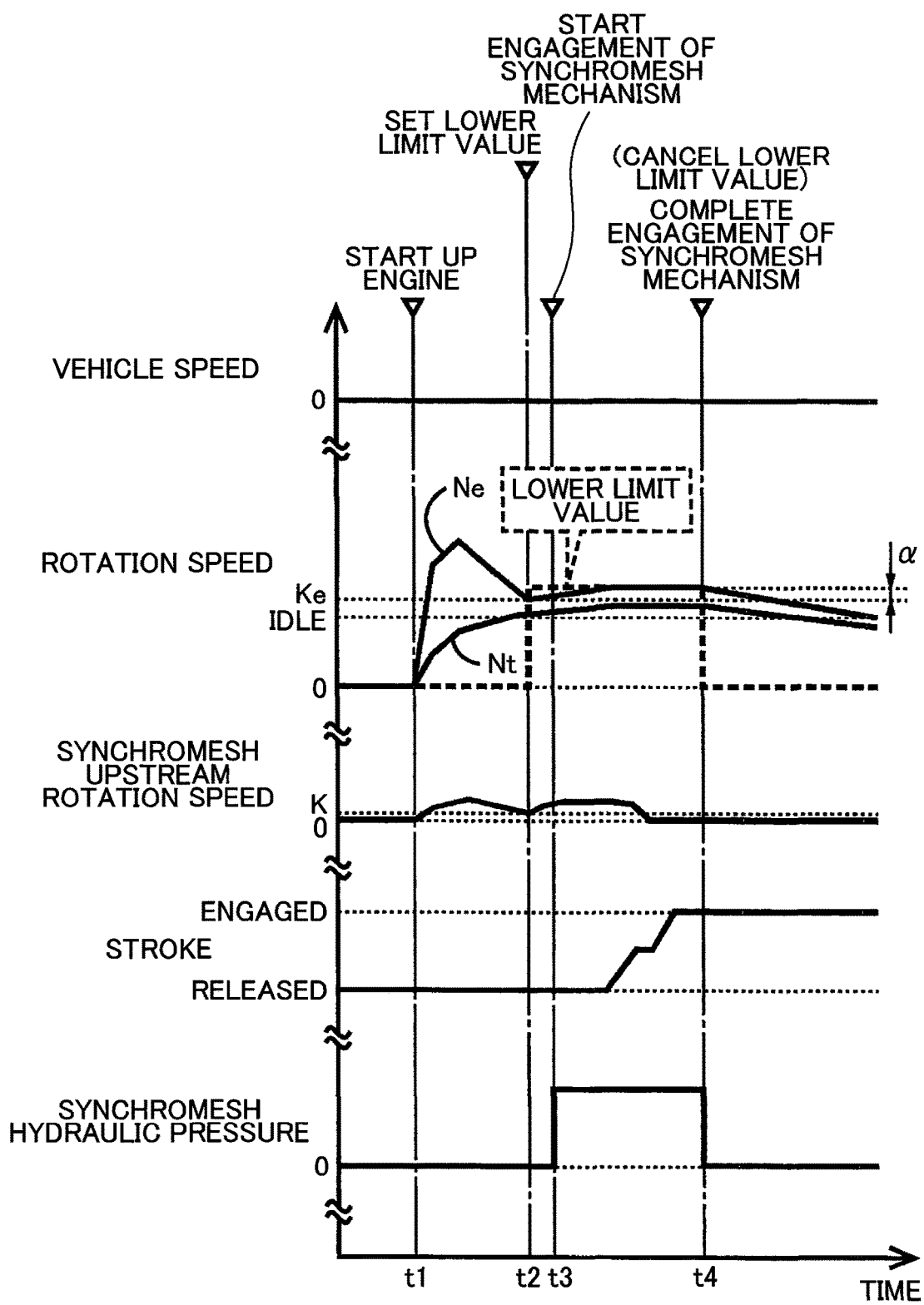
FIG. 11 is an example of a time chart in the case where the control operations shown in the flowchart of FIG. 10 are executed.

FIG. 10 is a flowchart that illustrates a relevant portion of control operations of the electronic control unit 80, that is, control operations for suppressing occurrence of an uplock of the dog clutch D1 even during a stop of the vehicle. This flowchart is repeatedly executed, for example, when the engine start-up request is issued. FIG. 11 is an example of a time chart in the case where the control operations shown in the flowchart of FIG. 10 are executed. FIG. 10 shows the embodiment different from FIG. 8. Hereinafter, portions different from FIG. 8 will be mainly described.

In FIG. 10, subsequent to S10, in S12 corresponding to the engine output control unit 100, for example, it is determined whether the engine rotation speed Ne increased in process of start-up of the engine 12 has decreased. When negative determination is made in S12, S12 is repeatedly executed. When affirmative determination is made in S12, in S15 corresponding to the synchronized state determination unit 106, for example, when the dog clutch D1 is in the released state, it is determined whether the synchromesh upstream rotation speed Nsf is lower than or equal to the predetermined value K. When affirmative determination is made in S15, in S20 corresponding to the engine output control unit 100, for example, a value ($=Ke+\alpha$), obtained by adding the predetermined correction value $\alpha$ to an engine rotation speed Ke at the time when the synchromesh upstream rotation speed Nsf becomes lower than or equal to the predetermined value K, is set as the predetermined lower limit value Nelim (see t2 timing in FIG. 11). When negative determination is made in S15 or subsequent to S20, in S30 corresponding to the change control unit 104, for example, it is determined whether the predetermined time has elapsed from the beginning of start-up of the engine 12. When negative determination is made in S30, the process returns to s15. When affirmative determination is made in S30, in S40 corresponding to the change control unit 104, for example, a command to operate the synchromesh mechanism S1 (for example, a command to apply the synchromesh hydraulic pressure) is output so that the released dog clutch D1 (synchromesh mechanism S1) is engaged (see t3 timing in FIG. 11). As shown in FIG. 11, because the synchromesh upstream rotation speed Nsf becomes lower than or equal to the predetermined value K as a result of a decrease in the engine rotation speed Ne increased in process of start-up of the engine 12, the value ($=Ke+\alpha$), obtained by adding the predetermined correction value $\alpha$ to the engine rotation speed Ke at the time when the synchromesh upstream rotation speed Nsf becomes lower than or equal to the predetermined value K, is set as the predetermined lower limit value Nelim during the period from t2 timing to t4 timing. Thus, the engine rotation speed Ne is kept at the predetermined lower limit value Nelim or higher, and the synchromesh upstream rotation speed Nsf has been increased beyond the predetermined value K at t3 timing at which operation of the synchromesh mechanism S1 is started. Thus, the dog clutch D1 (synchromesh mechanism S1) is appropriately engaged.

As described above, according to the present embodiment, similar advantageous effects to those of the above-described first embodiment are obtained. Particularly, when the synchromesh upstream rotation speed Nsf becomes lower than or equal to the predetermined value K as a result of a decrease in the engine rotation speed Ne increased in process of start-up of the engine 12, the value, obtained by adding the predetermined correction value $\alpha$ to the engine rotation speed Ke at the time when the synchromesh upstream rotation speed Nsf becomes lower than or equal to the predetermined value K, is set as the predetermined lower limit value Nelim. Thus, the engine 12-side predetermined rotating member in the dog clutch D1 is rotated at the rotation speed beyond the predetermined value K.

Fourth Embodiment

In the above-described first to third embodiments, the predetermined lower limit value Nelim is set; however, the synchromesh upstream rotation speed Nsf can still become lower than or equal to the predetermined value K at the time when operation of the synchromesh mechanism S1 is started. Therefore, for example, in addition to the above-described first to third embodiments, when the synchromesh upstream rotation speed Nsf is lower than or equal to the predetermined value K at the time when the change control unit 104 starts engagement of the dog clutch D1, the engine output control unit 100 according to the present embodiment updates the predetermined lower limit value Nelim with a value higher than a value before engagement of the dog clutch D1 is started. For example, the engine output control unit 100 sets a value (=Nelimk+β), obtained by adding a predetermined correction value β to the already set predetermined lower limit value Nelimk, as a new predetermined lower limit value Nelim. The predetermined correction value β is, for example, a correction amount determined in advance as the amount of increase in the engine rotation speed Ne in order for the synchromesh upstream rotation speed Nsf to exceed the predetermined value K.

Figure 12:
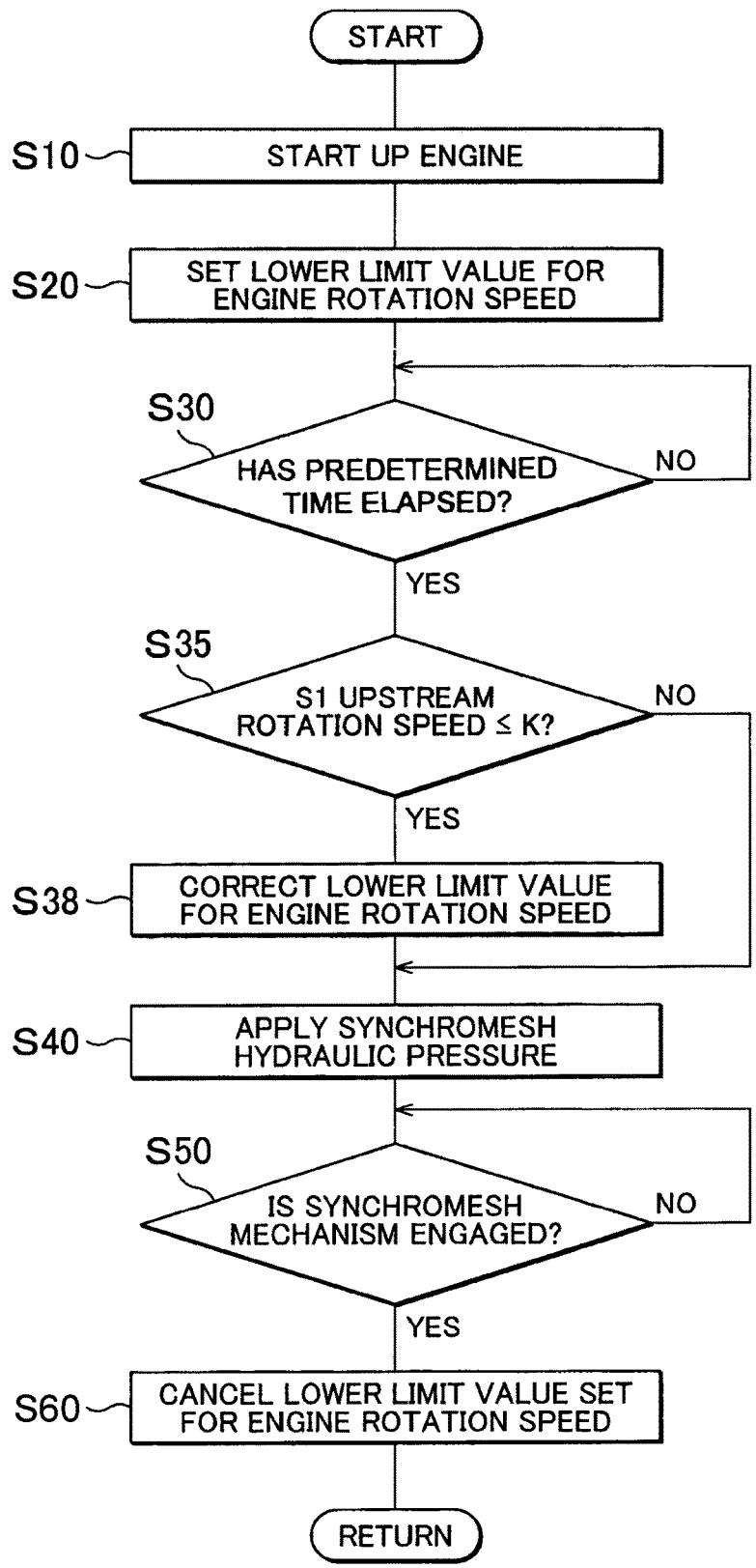
FIG. 12 is a flowchart that illustrates a relevant portion of control operations of the electronic control unit, that is, control operations for suppressing occurrence of an uplock of the dog clutch even during a stop of the vehicle, according to an embodiment different from that of FIG. 6.
Figure 13:
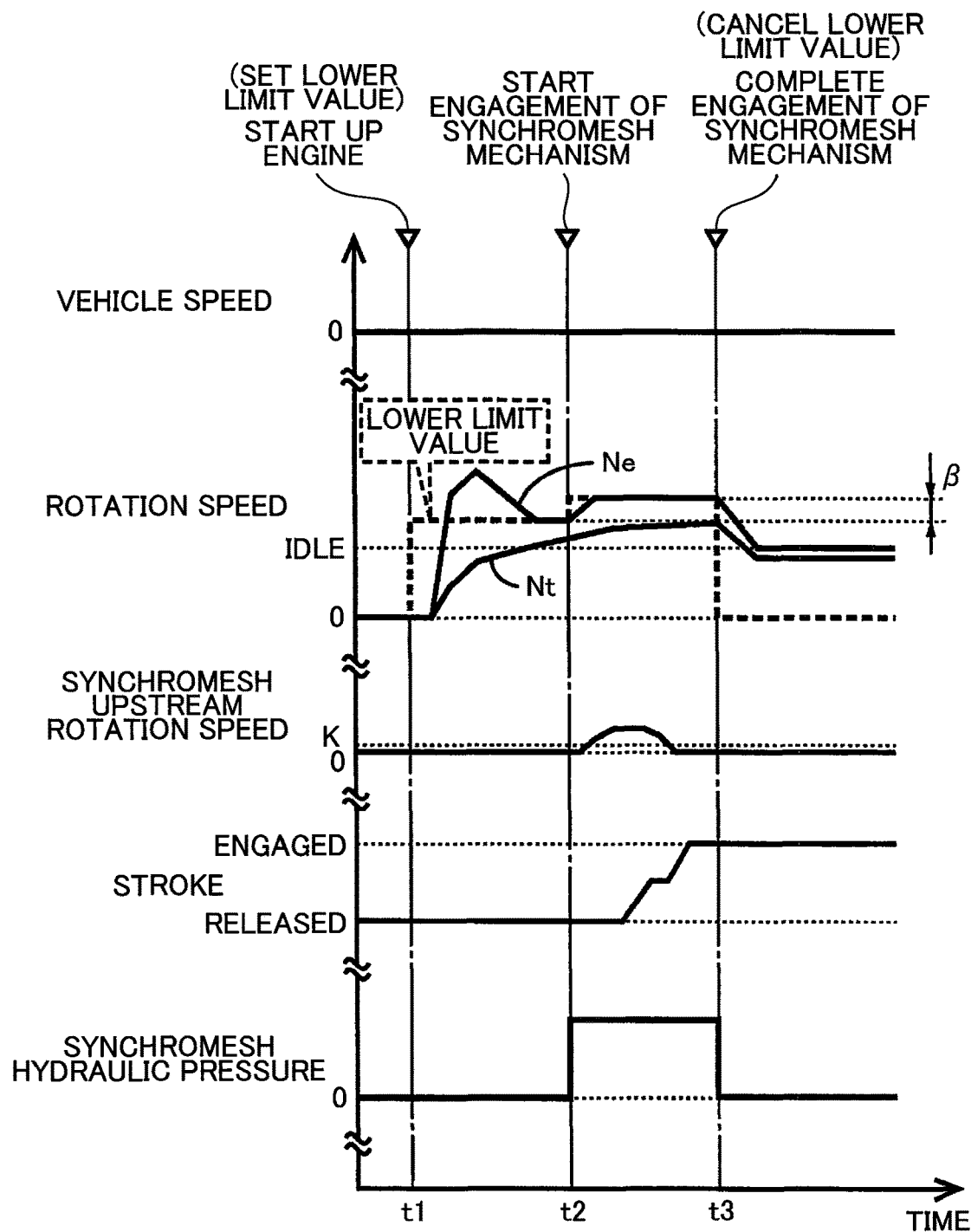
FIG. 13 is an example of a time chart in the case where the control operations shown in the flowchart of FIG. 12 are executed.

FIG. 12 is a flowchart that illustrates a relevant portion of control operations of the electronic control unit 80, that is, control operations for suppressing occurrence of an uplock of the dog clutch D1 even during a stop of the vehicle. This flowchart is repeatedly executed, for example, when the engine start-up request is issued. FIG. 13 is an example of a time chart in the case where the control operations shown in the flowchart of FIG. 12 are executed. FIG. 12 shows the embodiment different from FIG. 6. Hereinafter, portions different from FIG. 6 will be mainly described.

In FIG. 12, subsequent to S20, in S30 corresponding to the change control unit 104, for example, it is determined whether the predetermined time has elapsed from the beginning of start-up of the engine 12. When negative determination is made in S30, S30 is repeatedly executed. When affirmative determination is made in S30, in S35 corresponding to the synchronized state determination unit 106, for example, it is determine whether the synchromesh upstream rotation speed Nsf is lower than or equal to the predetermined value K in advance of the start of engagement of the dog clutch D1 (see t2 timing in FIG. 13). When affirmative determination is made in S35, in S38 corresponding to the engine output control unit 100, for example, the predetermined lower limit value Nelim is updated with a value higher than a value before engagement of the dog clutch D1 is started (see t2 timing in FIG. 13). When negative determination is made in S35 or subsequent to S38, in S40 corresponding to the change control unit 104, for example, a command to operate the synchromesh mechanism S1 (for example, a command to apply the synchromesh hydraulic pressure) is output so that the released dog clutch D1 (synchromesh mechanism S1) is engaged (see t2 timing in FIG. 13). As shown in FIG. 13, because the synchromesh upstream rotation speed Nsf is lower than or equal to the predetermined value K at the time when engagement of the dog clutch D1 is started (t2 timing), the predetermined lower limit value Nelim having a value higher by the predetermined correction value β than a value that has been set till then is set during the period from t2 timing to t3 timing. Thus, the synchromesh upstream rotation speed Nsf has been increased beyond the predetermined value K in process of operation of the synchromesh mechanism S1, so the dog clutch D1 (synchromesh mechanism S1) is appropriately engaged.

As described above, according to the present embodiment, similar advantageous effects to those of the above-described first embodiment are obtained. Particularly, when the synchromesh upstream rotation speed Nsf is lower than or equal to the predetermined value K at the time when engagement of the dog clutch D1 is started, the predetermined lower limit value Nelim is updated with a value higher than a value before engagement of the dog clutch D1 is started. Thus, the engine 12-side predetermined rotating member in the dog clutch D1 is easily rotated at the rotation speed beyond the predetermined value K.

Fifth Embodiment

In the above-described first to fourth embodiments, the predetermined lower limit value Nelim is set; however, an uplock of the dog clutch D1 can still occur. Therefore, for example, in addition to the above-described first to fourth embodiments, when an uplock has been detected in process of engagement of the dog clutch D1, the engine output control unit 100 according to the present embodiment updates the predetermined lower limit value Nelim with a value higher than a value at the timing at which an uplock of the dog clutch D1 has been detected. For example, the engine output control unit 100 sets a value (=Nelimk+γ), obtained by adding a predetermined correction value γ to the already set predetermined lower limit value Nelimk, as a new predetermined lower limit value Nelim. Therefore, the synchronized state determination unit 106 according to the present embodiment, for example, further determines on the basis of a mode of change in the synchronization stroke STs whether there occurs an uplock in process of engagement of the dog clutch D1. The predetermined correction value γ is, for example, a correction value determined in advance as the amount of increase in the engine rotation speed Ne for, when there occurs an uplock of the dog clutch D1, eliminating the uplock.

Figure 14:
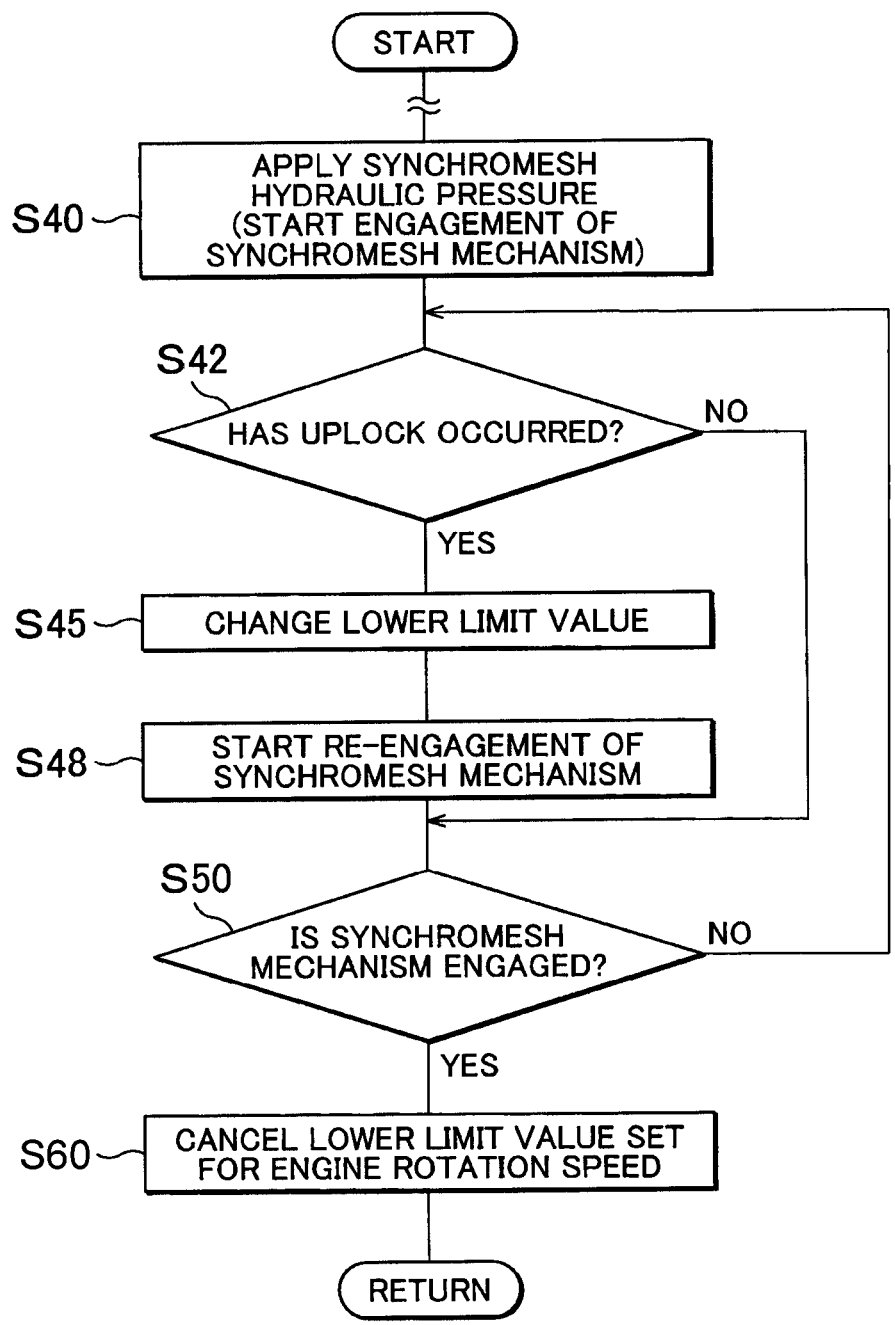
FIG. 14 is a flowchart that illustrates a relevant portion of control operations of the electronic control unit, that is, control operations for suppressing occurrence of an uplock of the dog clutch even during a stop of the vehicle, and that shows a portion from S40 in each of FIG. 6, FIG. 8, FIG. 10 and FIG. 12.
Figure 15:
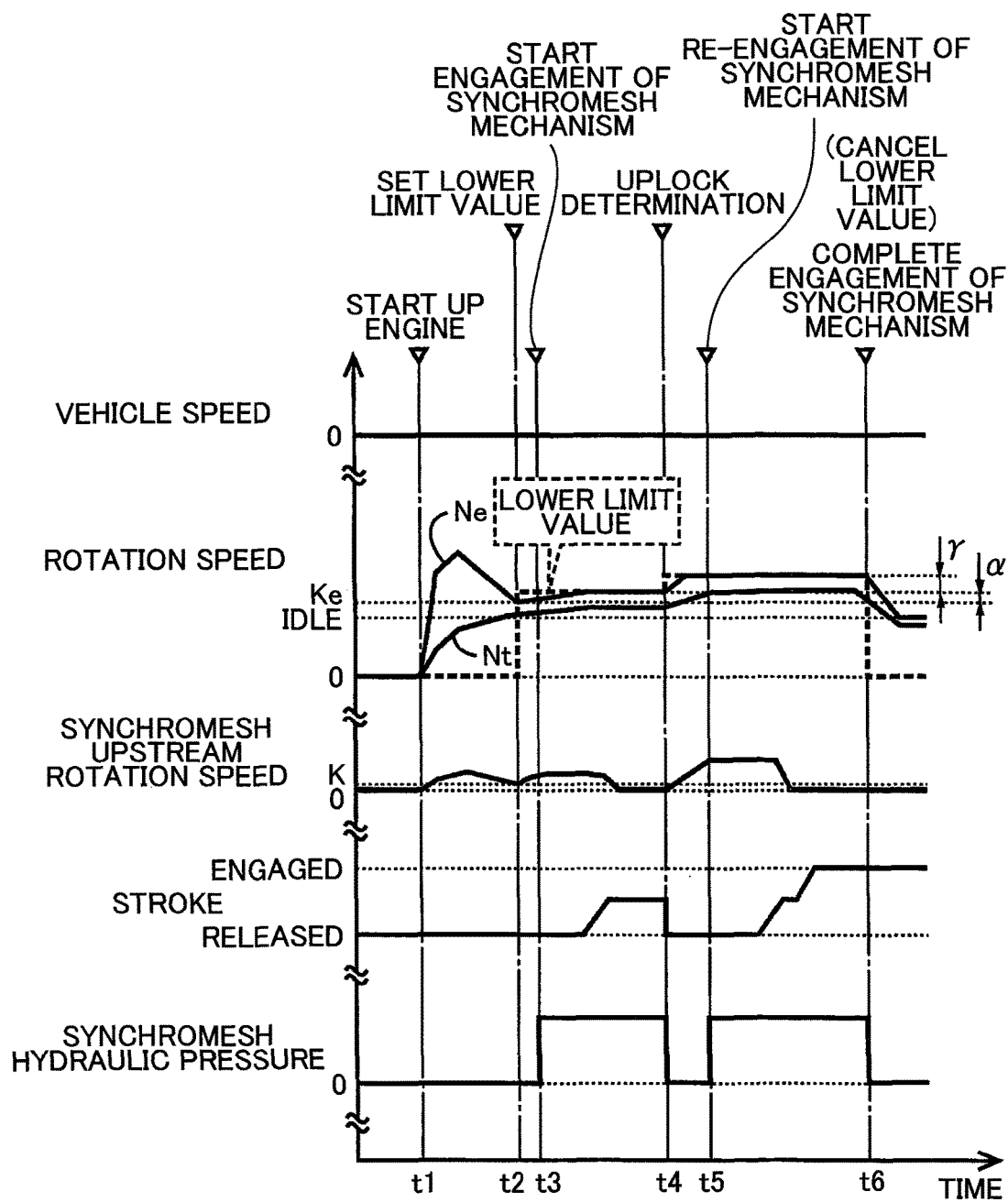
FIG. 15 is an example of a time chart in the case where the control operations shown in the flowchart of FIG. 14 are executed.

FIG. 14 is a flowchart that illustrates a relevant portion of control operations of the electronic control unit 80, that is, control operations for suppressing occurrence of an uplock of the dog clutch D1 even during a stop of the vehicle. This flowchart is repeatedly executed, for example, when the engine start-up request is issued. FIG. 15 is an example of a time chart in the case where the control operations shown in the flowchart of FIG. 14 are executed. FIG. 14 mainly differs from each of FIG. 6, FIG. 8, FIG. 10 and FIG. 12 in a portion from S40, so FIG. 14 shows the different portion. Hereinafter, the different portion will be mainly described. FIG. 15 shows an example in which there occurs an uplock in engagement operation of the dog clutch D1, which is carried out during the period from t3 timing to t4 timing in FIG. 11.

In FIG. 14, in S40 corresponding to the change control unit 104, for example, a command to operate the synchromesh mechanism S1 (for example, a command to apply the synchromesh hydraulic pressure) is output so that the released dog clutch D1 (synchromesh mechanism S1) is engaged (see t3 timing in FIG. 15). Subsequently, in S42 corresponding to the synchronized state determination unit 106, for example, it is determined on the basis of a mode of change in the synchronization stroke STs whether there occurs an uplock in process of engagement of the dog clutch D1. When affirmative determination is made in S42, in S45 corresponding to the engine output control unit 100, for example, the predetermined lower limit value Nelim is updated with a value higher than a value at the timing at which an uplock of the dog clutch D1 has been detected (see t4 timing in FIG. 15). Subsequently, in S48 corresponding to the change control unit 104, for example, just after the predetermined lower limit value Nelim has been updated or after a predetermined standby time has elapsed, a command to operate the synchromesh mechanism S1 (for example, a command to apply the synchromesh hydraulic pressure) is output again so that the released dog clutch D1 (synchromesh mechanism S1) is engaged (see t5 timing in FIG. 15). When negative determination is made in S42 or subsequent to S48, in S50 corresponding to the synchronized state determination unit 106, for example, it is determined on the basis of the synchronization stroke STs whether engagement of the dog clutch D1 (synchromesh mechanism S1) has completed. When negative determination is made in S50, the process returns to S42. When affirmative determination is made in S50, in S60 corresponding to the engine output control unit 100, for example, the predetermined lower limit value Nelim set for the engine rotation speed Ne is cancelled (see t6 timing in FIG. 15). As shown in FIG. 15, because there occurs an uplock of the dog clutch D1 in process of engagement of the dog clutch D1 during the period from t3 timing to t4 timing, the predetermined lower limit value Nelim having a value higher by the predetermined correction value γ than a value that has been set till then is set during the period from t4 timing to t6 timing. Thus, the synchromesh upstream rotation speed Nsf is further increased beyond the predetermined value K as compared to the synchromesh upstream rotation speed Nsf during the period from t3 timing to t4 timing in process of re-operation of the synchromesh mechanism S1 during the period from t5 timing to t6 timing, so the dog clutch D1 (synchromesh mechanism S1) is appropriately engaged.

As described above, according to the present embodiment, similar advantageous effects to those of the above-described first embodiment are obtained. Particularly, when an uplock has been detected in process of engagement of the dog clutch D1, the predetermined lower limit value Nelim is updated with a value higher than a value at the timing at which the uplock of the dog clutch D1 has been detected. Thus, the engine 12-side predetermined rotating member in the dog clutch D1 is easily rotated.

The embodiments of the invention are described in detail with reference to the accompanying drawings; however, the invention is also applied to other embodiments.

For example, in the above-described embodiments, each embodiment is implemented solely; however, each individual embodiment does not always need to be implemented solely, and may be implemented in combination as needed. Specifically, in the above-described first embodiment or second embodiment, a value determined in advance is set as the predetermined lower limit value Nelim; however, the invention is not limited to this configuration. For example, as described in the third embodiment, a value obtained occasionally may be set as the predetermined lower limit value Nelim for the first time, and, thereafter, the above-described first embodiment or second embodiment is executed by using the set predetermined lower limit value Nelim. A value that is set as the predetermined lower limit value Nelim in the above-described first embodiment or second embodiment may be corrected by executing the above-described third embodiment every several times of execution of control. Other than the above, in the above-described fourth embodiment, the predetermined lower limit value Nelim in the above-described first embodiment is corrected. Instead, the predetermined lower limit value Nelim in the above-described second embodiment or third embodiment may be corrected. In the above-described fifth embodiment, the predetermined lower limit value Nelim in the above-described third embodiment is corrected. Instead, the predetermined lower limit value Nelim in the above-described first embodiment or second embodiment may be corrected or the corrected predetermined lower limit value Nelim in the above-described fourth embodiment may be further corrected.

In the above-described first, second, third, fourth and fifth embodiments, the embodiment of the invention is described in the case where the dog clutch D1 is engaged along with engine start-up during a stop of the vehicle in an engine stopped state; however, the embodiment of the invention is not limited to such a case. For example, the invention is also applicable to the case where the dog clutch D1 is engaged in advance of engagement of any one of the reverse brake B1, the forward clutch C1 and the belt driving clutch C2 during a stop of the vehicle in a neutral state where the engine 12 has been already operating. In such a case, when the synchromesh mechanism S1 is operated, the engine rotation speed Ne of the already operating engine 12 is further increased (for example, the engine rotation speed Ne kept at the idle rotation speed is controlled to the predetermined lower limit value Nelim or higher) as compared to when the synchromesh mechanism S1 is not operated.

In the above-described first, second, third, fourth and fifth embodiments, the embodiment of the invention is described by way of the power transmission system 16 (vehicle 10) including the continuously variable transmission 24 and the gear mechanism 28 that are provided in parallel with each other between the engine 12 and the drive wheels 14; however, the vehicle to which the invention is applied is not limited to this configuration. In short, as long as the vehicle includes the dog clutch D1 that is equipped with the synchromesh mechanism S1 and that transmits power or interrupts transmission of power in the power transmission path that transmits power of the engine 12 toward the drive wheels 14, the invention is applicable.

In the above-described first, second, third, fourth and fifth embodiments, the forward/reverse switching device 26-side predetermined rotating member (for example, the first gear 50) in the dog clutch D1 is rotated by drag torque in the released forward clutch C1. Instead, the forward/reverse switching device 26-side predetermined rotating member (for example, the first gear 50) in the dog clutch D1 may be rotated by drag torque in the released reverse brake B1. In this case, for example, the synchromesh upstream rotation speed Nsf is reduced from substantially zero; however, there also occurs rotation in the first gear 50.

The predetermined value K in each of the above-described second, third, fourth and fifth embodiments may be the same value or may be a different value from each other.

In the above-described embodiments, the driving pattern of the power transmission system 16 is changed by using a predetermined shift map; however, the invention is not limited to this configuration. For example, the driving pattern of the power transmission system 16 may be changed by calculating a driver's required driving amount (for example, required torque) on the basis of the vehicle speed V and the accelerator operation amount θacc and then setting a gear ratio that satisfies the required torque.

In the above-described embodiments, the hub sleeve 54 is actuated by the hydraulic actuator; however, the actuator for the hub sleeve 54 is not limited to the hydraulic actuator. For example, the hub sleeve 54 may be actuated by an electric motor. In the dog clutch D1, the hub sleeve 54 is constantly fitted to the first gear 50; however, the configuration of the hub sleeve 54 is not limited to this configuration. For example, the invention is also applicable even when the dog clutch D1 has such a structure that the hub sleeve 54 is constantly fitted to the second gear 52.

In the above-described embodiments, when the synchromesh mechanism S1 is operated in order to engage the dog clutch D1 in a state where the vehicle 10 is stopped and the friction clutches (that is, the reverse brake B1 and the forward clutch C1) are released, the friction clutch-side predetermined rotating member in the synchromesh mechanism S1 is rotated by relatively increasing the engine rotation speed Ne. However, another embodiment different from this configuration is conceivable. For example, when the synchromesh mechanism S1 is operated in a state where the friction clutches are released, the friction clutch-side predetermined rotating member in the synchromesh mechanism S1 is rotated even by reducing the distance between the input and output friction materials of any one of the friction clutches. The distance between the input and output friction materials of the any one of the friction clutches is reduced to such an extent that, for example, driving force that moves the vehicle 10 is not transmitted and the friction clutch-side predetermined rotating member in the synchromesh mechanism S1 is set to a state that is not a rotation stopped state. By supplying a hydraulic pressure to achieve such an extent, the friction clutch-side predetermined rotating member in the synchromesh mechanism S1 is rotated.

The above-described embodiments are only illustrative, and the invention may be implemented in modes including various modifications or improvements on the basis of the knowledge of persons skilled in the art.

What is claimed is:

1. A control apparatus for a vehicle, the vehicle including an engine,
    a dog clutch configured to transmit power or interrupt transmission of power in a power transmission path that transmits power of the engine to a drive wheel, the dog clutch including a synchromesh mechanism, and
    a friction clutch configured to transmit power or interrupt transmission of power in the power transmission path between the engine and the dog clutch, the control apparatus comprising:
    an electronic control unit configured to, when the synchromesh mechanism is operated in order to engage the dog clutch in a state where the vehicle is stopped and the friction clutch is released, increase a rotation speed of the engine as compared to when the synchromesh mechanism is not operated, and
    the electronic control unit being configured to, when the dog clutch is engaged along with start-up of the engine, i) set a predetermined lower limit value for the rotation speed of the engine and ii) control the rotation speed of the engine to the lower limit value or higher, until engagement of the dog clutch completes.

2. The control apparatus according to claim 1, wherein the electronic control unit is configured to set the predetermined lower limit value for the rotation speed of the engine simultaneously with start-up of the engine.

3. The control apparatus according to claim 1, wherein the electronic control unit is configured to, when a rotation speed of a predetermined rotating member of the dog clutch is lower than or equal to a predetermined value after completion of start-up of the engine, set the predetermined lower limit value for the rotation speed of the engine, and the predetermined rotating member of the dog clutch is arranged on the engine side.

4. The control apparatus according to claim 1, wherein the electronic control unit is configured to, when a rotation speed of a predetermined rotating member of the dog clutch becomes lower than or equal to a predetermined value as a result of a decrease in the rotation speed of the engine, which has increased in process of start-up of the engine, set the predetermined lower limit value to a value obtained by adding a predetermined correction value to the rotation speed of the engine at a time when the rotation speed of the predetermined rotating member becomes lower than or equal to the predetermined value, and
the predetermined rotating member of the dog clutch is arranged on the engine side.

5. The control apparatus according to claim 1, wherein the electronic control unit is configured to, when a rotation speed of a predetermined rotating member of the dog clutch is lower than or equal to a predetermined value at a time when engagement of the dog clutch is started, update the predetermined lower limit value with a value higher than a value before engagement of the dog clutch is started, and the predetermined rotating member of the dog clutch is arranged on the engine side.

6. The control apparatus according to claim 1, wherein the electronic control unit is configured to, when an engagement fault is detected in process of engagement of the dog clutch, update the predetermined lower limit value with a value higher than a value at timing at which the engagement fault of the dog clutch is detected.

* * * * *